United States Patent
Nakatsugawa

(10) Patent No.: US 8,423,031 B2
(45) Date of Patent: Apr. 16, 2013

(54) COMMUNICATION SYSTEM, BASE STATION, RELAY STATION, MOBILE STATION, AND COMMUNICATION METHOD

(75) Inventor: Keiichi Nakatsugawa, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 13/478,632

(22) Filed: May 23, 2012

(65) Prior Publication Data

US 2012/0231801 A1   Sep. 13, 2012

Related U.S. Application Data

(63) Continuation of application No. PCT/JP2009/071797, filed on Dec. 28, 2009.

(51) Int. Cl.
*H04W 40/00* (2009.01)
(52) U.S. Cl.
USPC ........... 455/445; 455/436; 455/502; 370/350; 370/325; 375/272
(58) Field of Classification Search .................. 455/11.1, 455/16, 17, 517, 427, 562.1, 561, 445, 436, 455/502; 370/349, 401, 315, 312, 517, 350, 370/328, 338, 278; 398/125, 129; 342/457, 342/370; 375/272
See application file for complete search history.

(56) References Cited

U.S. PATENT DOCUMENTS

| | | | | |
|---|---|---|---|---|
| 2005/0232183 | A1* | 10/2005 | Sartori et al. | 370/319 |
| 2006/0252367 | A1* | 11/2006 | Haartsen | 455/11.1 |
| 2007/0058577 | A1* | 3/2007 | Rubin | 370/328 |
| 2007/0110016 | A1* | 5/2007 | Shen et al. | 370/338 |
| 2008/0247350 | A1* | 10/2008 | Tsai et al. | 370/315 |
| 2009/0213766 | A1* | 8/2009 | Chindapol et al. | 370/278 |

FOREIGN PATENT DOCUMENTS

| | | |
|---|---|---|
| EP | 1786144 | 5/2007 |
| JP | 5-502988 | 5/1993 |
| JP | 8-508630 | 9/1996 |
| JP | 2007-143138 | 7/2007 |
| JP | 2008-048218 | 2/2008 |
| JP | 2008-172792 | 7/2008 |

(Continued)

OTHER PUBLICATIONS

IEEE: "Part 16: Air Interface for Broadband Wireless Access Systems"; IEEE Std 802.16 tm-2009 (Revision of IEEE Std 802.16-2004); May 29, 2009.

(Continued)

*Primary Examiner* — Mahendra Patel
(74) *Attorney, Agent, or Firm* — Myers Wolin, LLC

(57) ABSTRACT

In a communication system a base station maps paging information the destinations of which are a plurality of mobile stations to a specific frame of frames and transmits the specific frame to a relay station. The relay station for relaying communication between the base station and the plurality of mobile stations receives the specific frame, maps the paging information the destination of which are the plurality of mobile stations and which is mapped to the specific frame, to the remaining frames of the frames on the basis of a determined rule, and transmits the remaining frames to the plurality of mobile stations. When the plurality of mobile stations are under the control of the relay station, the plurality of mobile stations receive the remaining frames and acquire the paging information on the basis of the determined rule.

13 Claims, 21 Drawing Sheets

FOREIGN PATENT DOCUMENTS

| | | |
|---|---|---|
| JP | 2009-206790 | 9/2009 |
| WO | 91/10331 | 7/1991 |
| WO | 95/12930 | 5/1995 |

OTHER PUBLICATIONS

IEEE: "Part 16: Air Interface for Broadband Wireless Access Systems; Amendment 1: Multihop Relay Specification"; IEEE Std 802.16j tm-2009; Jun. 12, 2009.

IEEE Draft Amendment; "Part 16: Air Interface for Fixed and Mobile Broadband Wireless Access Systems"; IEEE P802.16m/D2; Oct. 2009.

International Search Report issued for corresponding Japanese Patent Application PCT/JP2009/071797 mailed Feb. 9, 2010.

* cited by examiner

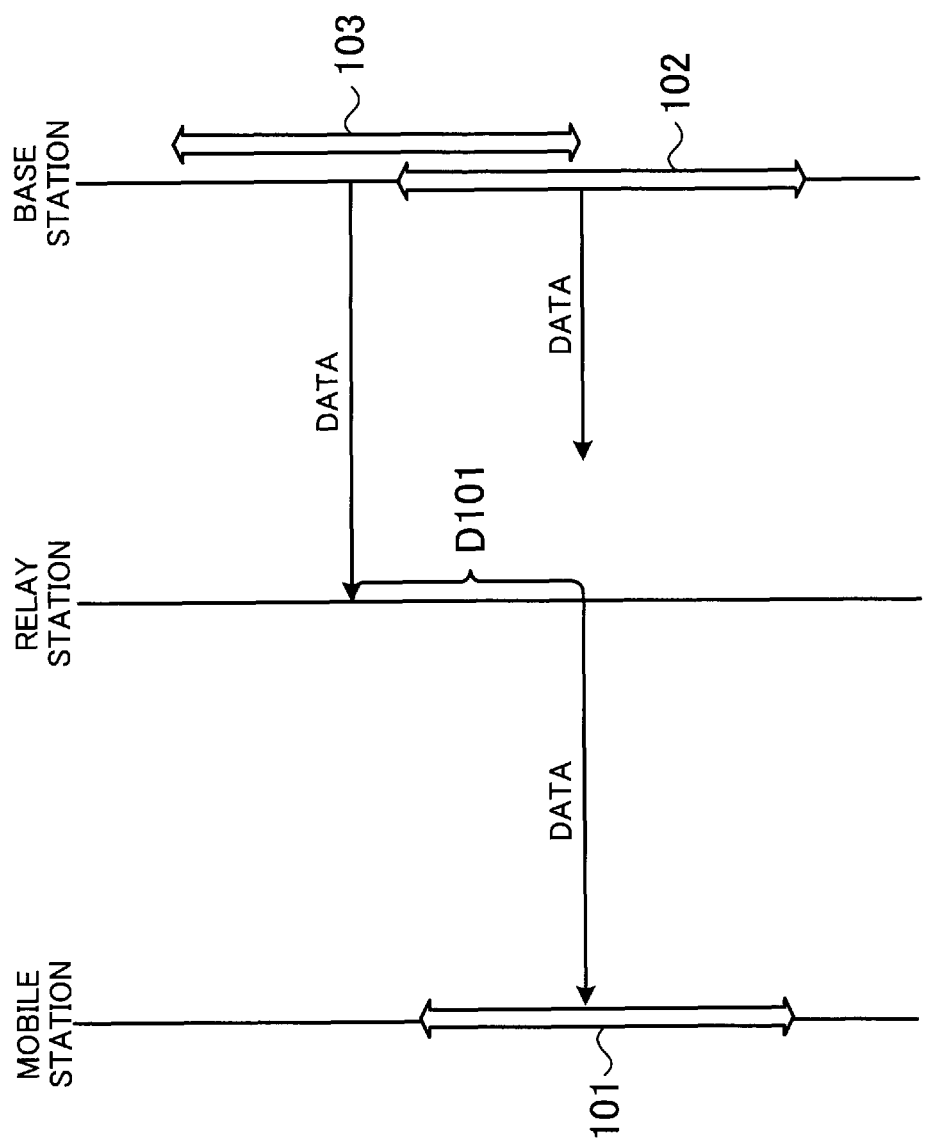

COMMUNICATION SYSTEM, BASE STATION, RELAY STATION, MOBILE STATION, AND COMMUNICATION METHOD

CROSS-REFERENCE TO RELATED APPLICATION

This application is a continuation of International Application PCT/JP2009/071797, filed on Dec. 28, 2009, now pending, the contents of which are herein wholly incorporated by reference.

FIELD

The embodiments discussed herein are related to a communication system, a base station, a relay station, a mobile station, and a communication method for performing radio communication.

BACKGROUND

In recent years attention has been paid to high-speed communication systems, such as WiMAX (Worldwide Interoperability for Microwave Access), which cover wide coverage areas. In communication systems such as WiMAX, communication is usually performed between a base station connected to an upper network by a wired link and a mobile station. In some cases, however, a relay station for performing relay transfer by radio is installed between a base station and a mobile station. This makes it possible to extend a communication area or improve the communication throughput of a mobile station.

At present IEEE Std 802.16-2009 (2009-05-29), for example, is standardized by IEEE (Institute of Electrical and Electronics Engineers) as a radio interface in a mobile WiMAX system. Furthermore, IEEE Std 802.16j-2009 (2009-06-12), for example, is standardized as extended specifications of its relay communication function. In addition, in order to accommodate IMT-Advanced which is a fourth generation mobile telecommunication system and which is in the process of being standardized by ITU-R (International Telecommunication Union—Radio communication sector), standardization of more advanced specifications of a radio interface is in progress and IEEE Draft P802.16m/D2 (2009-10-14), for example, is framed as a draft.

By the way, when a base station transmits data to a mobile station via a relay station, a time lag occurs in the relay station. As a result, there is a case where the mobile station cannot receive the data at timing at which the mobile station is to receive the data.

Accordingly, a radio relay communication method by which receiving or transmission timing is controlled with time which a radio relay station takes to perform a relay process (occurrence of a time lag) taken into consideration for the purpose of making it possible for a mobile station or a radio base station to correctly receive a message or data at scheduled timing was proposed in the past (see, for example, Japanese Laid-open Patent Publication No. 2008-48218).

With Japanese Laid-open Patent Publication No. 2008-48218), however, in order to make it possible for the mobile station to correctly receive data at scheduled timing, the base station manages transmission timing in which a time lag that occurs in the relay station is taken into consideration. This increases the load on the base station.

FIG. 21 is a view for describing an example of a communication system in which a time lag that occurs in a relay station is taken into consideration. FIG. 21 indicates the sequence of the operation of a base station, a relay station, and a mobile station.

A period 101 indicated in FIG. 21 is a period in which a mobile station receives data. A period 102 is a period in which a base station transmits the data. The periods 101 and 102 are equal in timing with a case where the mobile station is under the control of the base station taken into consideration.

A period 103 is a period in which the base station transmits the data to the mobile station via the relay station. The period 103 is earlier than the periods 101 and 102 with a time lag D101 which occurs in the relay station taken into consideration. As a result, the mobile station under the control of the relay station can correctly receive the data transmitted in the period 103.

The base station manages in this way not only the period 102 but also the period 103 in which the time lag D101 that occurs in the relay station is taken into consideration. This increases the load on the base station.

SUMMARY

According to an aspect of the invention, there is provided a communication system that includes: a base station that maps paging information destinations of which are a plurality of mobile stations to a specific frame of a plurality of frames and transmits the specific frame to a relay station; the relay station that, for relaying communication between the base station and the plurality of mobile stations, receives the specific frame, maps the paging information the destinations of which are the plurality of mobile stations and which is mapped to the specific frame to remaining frames of the plurality of frames on the basis of a determined rule, and transmits the remaining frames to the plurality of mobile stations; and the plurality of mobile stations that receive the remaining frames and acquire the paging information the destinations of which are the plurality of mobile stations, on the basis of the determined rule at the time of being under control of the relay station.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 21 is a view for describing an example of a communication system in which a time lag that occurs in a relay station is taken into consideration.

DESCRIPTION OF EMBODIMENTS

A first embodiment will now be described in detail with reference to the accompanying drawing.

Figure 1:
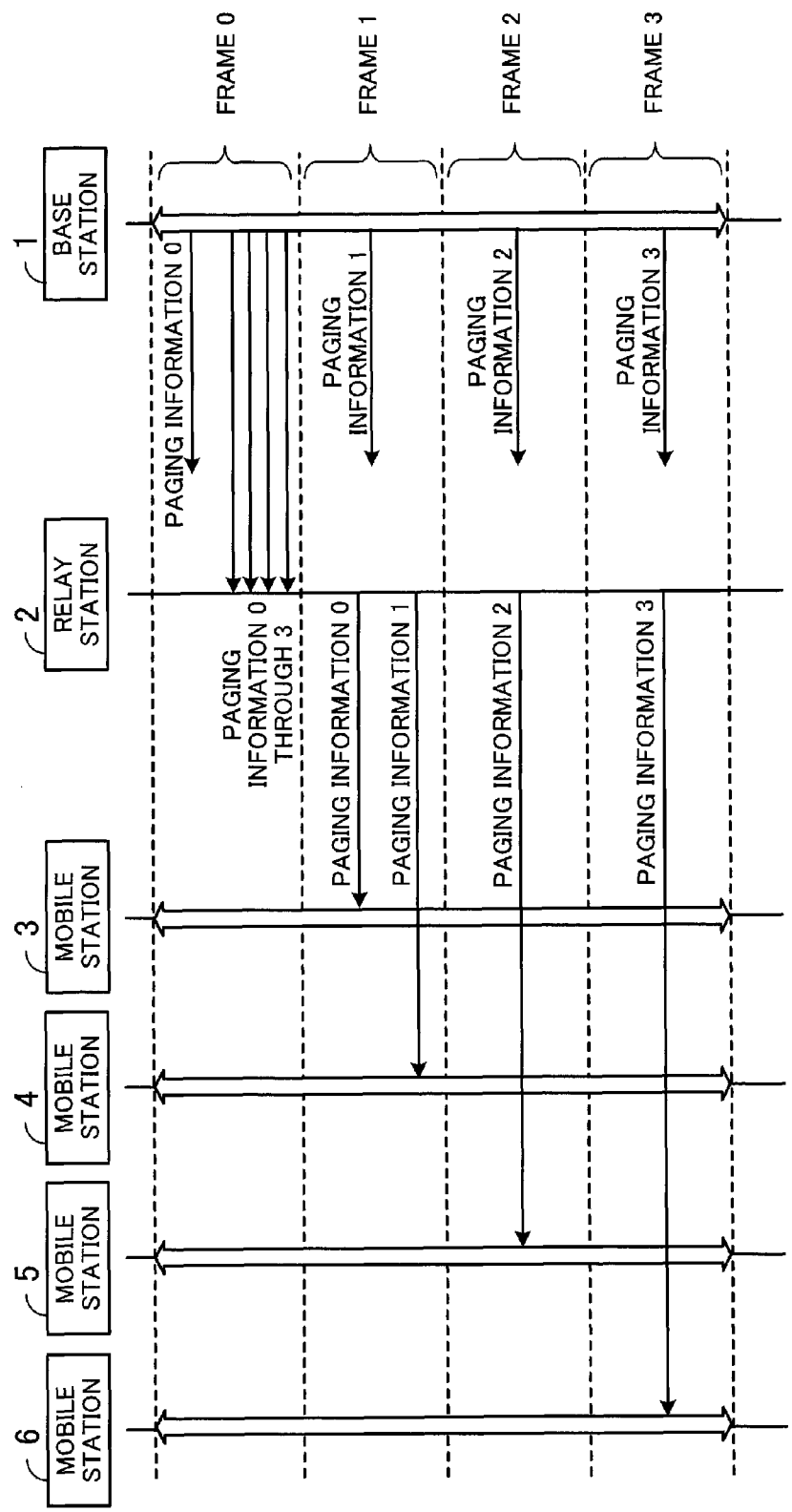
FIG. 1 illustrates a communication system according to a first embodiment.

FIG. 1 illustrates a communication system according to a first embodiment. A base station 1, a relay station 2, and mobile stations 3 through 6 are indicated in FIG. 1. In addition, paging information 0 through 3 and frames 0 through 3 transmitted or received by the base station 1, the relay station 2, and the mobile stations 3 through 6 are indicated in FIG. 1. As indicated by double-headed arrows in FIG. 1, the frames 0 through 3 periodically arrive.

The mobile stations 3 through 6 are under the control of the base station 1 or the relay station 2 and perform radio communication with the base station 1 or the relay station 2. In FIG. 1, it is assumed that the mobile stations 3 through 6 are under the control of the relay station 2 and that the mobile stations 3 through 6 perform radio communication with the base station 1 via the relay station 2.

The base station 1 transmits the paging information 0 through 3 destinations of which are the mobile stations 3 through 6 by the frames 0 through 3. As a result, even when the mobile stations 3 through 6 are under the control of the base station 1, the mobile stations 3 through 6 can receive the paging information 0 through 3 by the frames 0 through 3.

Furthermore, the base station 1 maps the paging information 0 through 3 the destinations of which are the mobile stations 3 through 6 to a specific frame and transmits the specific frame to the relay station 2 which relays communication between the base station 1 and the mobile stations 3 through 6.

For example, the base station 1 considers the frame 0 as the specific frame, maps the paging information 0 through 3 to the frame 0, and transmits the frame 0 to the relay station 2. Hereinafter the frame 0 may also be referred to as the "specific frame 0".

The relay station 2 receives the specific frame 0, maps the paging information 0 through 3 which is mapped to the specific frame 0 and the destinations of which are the mobile stations 3 through 6 to the remaining frames 1 through 3 of the frames 0 through 3 on the basis of a determined rule, and transmits the frames 1 through 3 to the mobile stations 3 through 6.

For example, the relay station 2 receives the paging information 0 through 3 by the specific frame 0, so the relay station 2 cannot transmit the paging information 0 which is to be transmitted by the frame 0 to the mobile stations 3 through 6 under the control of the relay station 2. Accordingly, the relay station 2 transmits the paging information 0 which is to be transmitted by the specific frame 0 by, for example, the frame 1 of the remaining frames 1 through 3 which is determined in advance, and transmits the paging information 1 through 3 by the frames 1 through 3 respectively.

When the mobile stations 3 through 6 are under the control of the relay station 2, the mobile stations 3 through 6 receive the remaining frames 1 through 3 other than the specific frame 0 on the basis of the determined rule and acquire the paging information 0 through 3 the destinations of which are the mobile stations 3 through 6. For example, it is assumed that the mobile station 3 receives the paging information 0 and that the determination that the paging information 0 is transmitted by the frame 1 is made in advance. In this case, the mobile station 3 receives not the frame 0 but the frame 1 and acquires the paging information 0 the destination of which is the mobile station 3.

As has been described, the base station 1 maps the paging information 0 through 3 the destinations of which are the mobile stations 3 through 6 to the frames 0 through 3. In addition, in order to transmit the paging information 0 through 3 to the relay station 2, the base station 1 maps the paging information 0 through 3 to the specific frame 0 of the frames 0 through 3. The relay station 2 receives the paging information 0 through 3 from the base station 1 by the specific frame 0 and transmits the paging information 0 through 3 by the frames 1 through 3 other than the specific frame 0. When the mobile stations 3 through 6 are under the control of the relay station 2, the mobile stations 3 through 6 receive the remaining frames 1 through 3 other than the specific frame 0 and receive the paging information 0 through 3 the destinations of which are the mobile stations 3 through 6. Accordingly, the base station 1 need only transmit the paging information 0 through 3 by the specific frame 0. That is to say, there is no need to take a time lag which otherwise will occur in the relay station 2 into consideration. As a result, the base station 1 can perform radio communication with the load controlled.

A second embodiment will now be described in detail with reference to the accompanying drawings.

Figure 2:
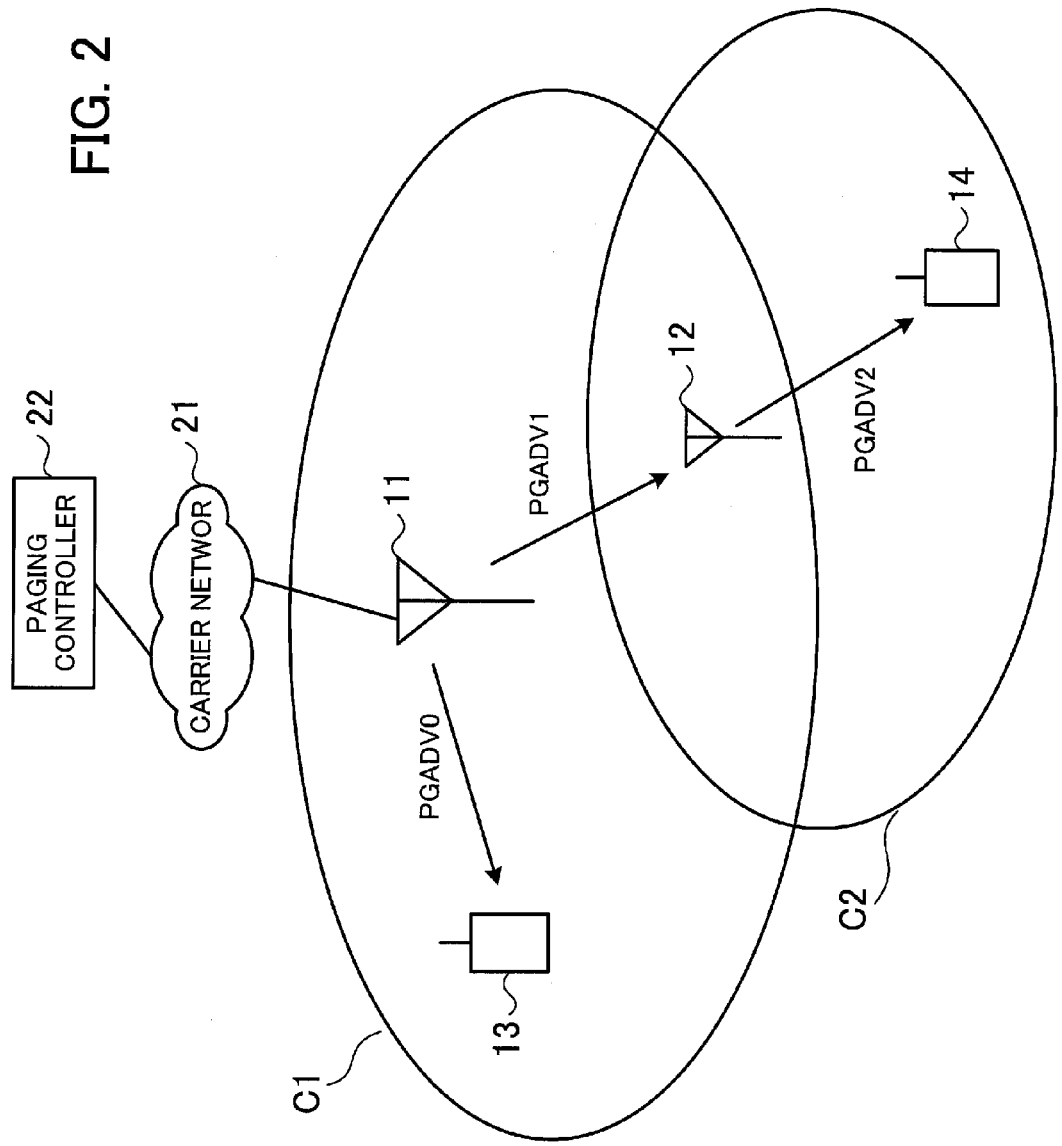
FIG. 2 illustrates a communication system according to a second embodiment.

FIG. 2 illustrates a communication system according to a second embodiment. A base station 11, a relay station 12, mobile stations 13 and 14, a carrier network 21, and a paging controller 22 are illustrated in FIG. 2. A communication area C1 indicated in FIG. 2 is a communication area in which radio communication can be performed between the base station 11 and the mobile stations 13 and 14. A communication area C2 indicated in FIG. 2 is a communication area in which radio communication can be performed between the relay station 12 and the mobile stations 13 and 14. Each of the mobile stations 13 and 14 is, for example, a WiMAX terminal and performs radio communication based on WiMAX.

The base station 11 is connected to the upper carrier network 21 by a wired link. The paging controller 22 is connected to the carrier network 21.

The relay station 12 is in the communication area C1 and can perform radio communication with the base station 11.

The mobile station 13 is in the communication area C1 and can perform radio communication with the base station 11. The mobile station 14 is in the communication area C2 of the relay station 12 and can perform radio communication with the relay station 12. Even when the mobile station 14 is outside the communication area C1 of the base station 11, the mobile station 14 can perform radio communication with the base station 11 via the relay station 12. The mobile station 13 may move into the communication area C2 of the relay station 12 or the mobile station 14 may move into the communication area C1 of the base station 11.

In a communication system such as WiMAX, the paging controller 22 connected to the carrier network 21 performs location management of a geographical area of the mobile station 13 or 14 which is not performing communication, that is to say, which is in a waiting state. A geographical area is defined as grouped base stations and relay stations which are referred to as a paging group.

When the mobile station 13 or 14 is in a waiting state, it is said that the mobile station 13 or 14 is in idle mode. The mobile station 13 or 14 which is in the idle mode is in a state in which it is connected to and controlled by no base station or relay station. No base station or relay station recognizes the presence or absence of the mobile station 13 or 14 in its communication area.

When another mobile station makes a call to the mobile station 13 or 14 which is in the idle mode, the communication system performs paging to make a call to the mobile station 13 or 14. The communication system gives the mobile station 13 or 14 instructions to make a connection to any base station and return to an ordinary state (connected state).

In the example of FIG. 2, for example, it is assumed that the base station 11 and the relay station 12 form the same paging group. Furthermore, it is assumed that the mobile station 14 is in the idle mode and that the mobile station 14 is registered in the paging controller 22.

When a call is made to the mobile station 14, the paging controller 22 detects a paging group to which the mobile station 14 belongs, and makes a paging advertisement (PGADV) transmission request to a base station and a relay station included in the detected paging group. At this time the paging controller 22 also transmits an identifier of the mobile station 14 to which the call is made.

When the base station 11 receives the transmission request from the paging controller 22, the base station 11 broadcasts a paging advertisement PGADV0 in its communication area C1. In addition, the base station 11 transfers a paging advertisement PGADV1 to the relay station 12 so that a paging advertisement will also be broadcast by the relay station 12. The relay station 12 which receives the paging advertisement PGADV1 broadcasts a paging advertisement PGADV2 in its communication area C2. The contents of the paging advertisements PGADV0 through PGADV2 are the same. In the above example, the identifier of the mobile station 14 to which the call is made is included in the paging advertisements PGADV0 through PGADV2.

As has been described, paging is performed in the communication area C1 of the base station 11 and the communication area C2 of the relay station 12 to make a call to the mobile station 14. The mobile station 14 which receives the paging advertisement PGADV2 from the relay station 12 detects that its identifier is included in the paging advertisement PGADV2, and makes a reconnection to the relay station 12 to return to an ordinary state.

Paging operation performed in the case of there being no relay station will now be described.

Figure 3:
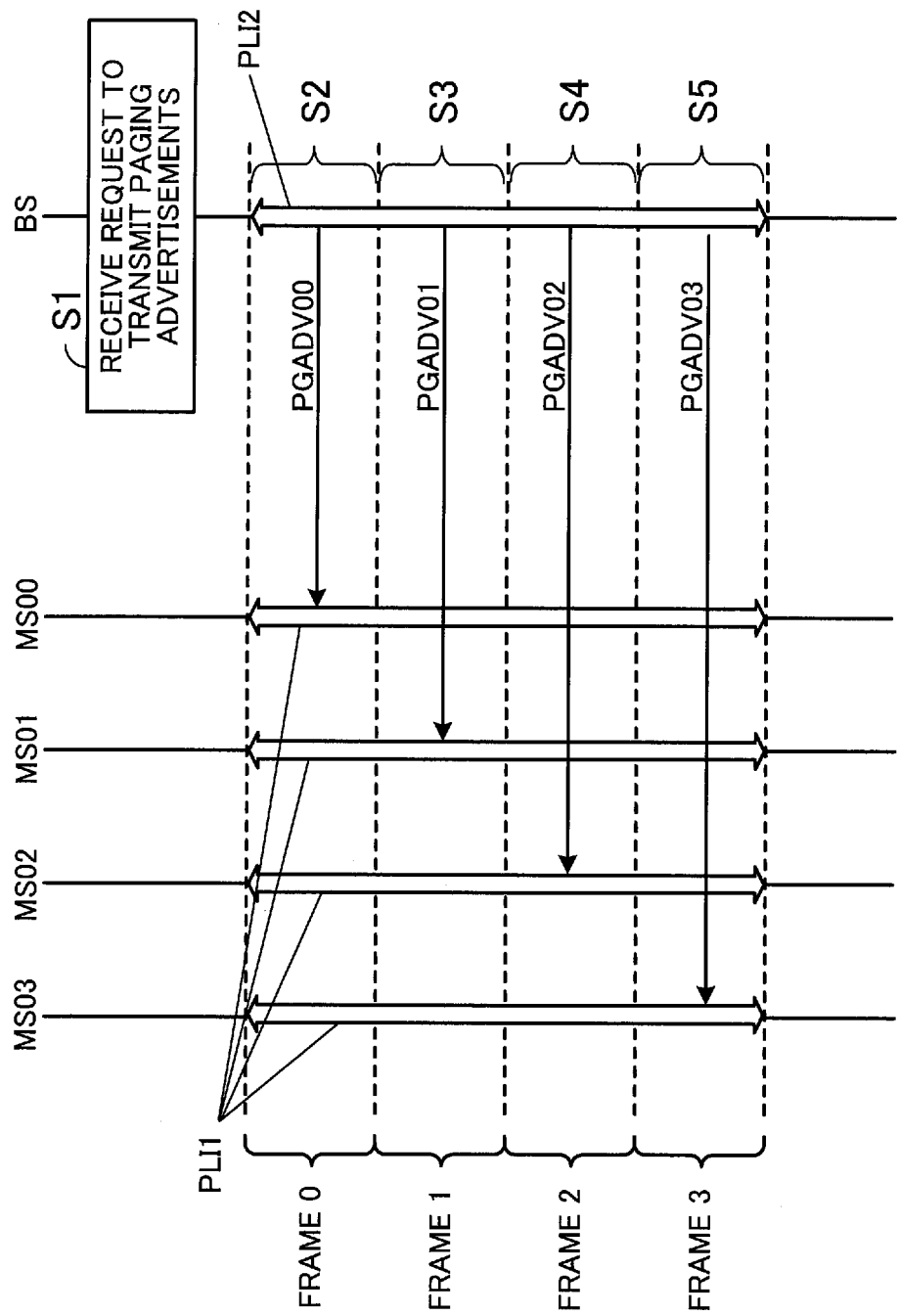
FIG. 3 is a sequence diagram of paging operation performed in the case of there being no relay station.

FIG. 3 is a sequence diagram of paging operation performed in the case of there being no relay station. FIG. 3 indicates the sequence of the operation of a base station and mobile stations. Hereinafter a base station and a mobile station may be referred to as a BS (Base Station) and an MS (Mobile Station) respectively.

In FIG. 3, there are four mobile stations MS00 through MS03 under the control (in a communication area) of a BS as mobile stations for which paging is performed. PLIs (Paging Listening Intervals) 1 which are equal in timing are set for the mobile stations MS00 through MS03 as a period (paging receiving period) in which a paging advertisement can be received.

The length of the PLIs 1 is, for example, one superframe including four frames 0 through 3. In order to transmit paging advertisements to the MS00 through MS03, the BS sets a PLI 2 which is equal to the PLIs 1 in timing.

When the MS00 through MS03 enter the idle mode, the MS00 through MS03 perform negotiations with the BS and determine cycles and offsets for setting the PLIs 1. In addition, separate identifiers referred to as TempID (Temporary Identifier) are assigned to the MS00 through MS03 by a paging controller. TempID are uniquely assigned to mobile stations in a paging group as identifiers used at the time of making calls to the MS00 through MS03 which are in the idle mode.

For example, it is assumed that the following TempID are assigned to the MS00 through MS03 by the paging controller.
MS00: TempID=0
MS01: TempID=1
MS02: TempID=2
MS03: TempID=3

With paging in IEEE Draft P802.16m the MS00 through MS03 determine, on the basis of TempID assigned by the paging controller, frames of the four frames in the PLIs 1 by which they receive paging advertisements. At this time the MS00 through MS03 do the following modulo arithmetic.
MS00: TempID mod 4=0 mod 4=0
MS01: TempID mod 4=1 mod 4=1
MS02: TempID mod 4=2 mod 4=2
MS03: TempID mod 4=3 mod 4=3

As a result, the MS00 receives the paging advertisement by the leading frame 0 of the PLI 1. The MS01 receives the paging advertisement by the second frame 1 of the PLI 1. The MS02 receives the paging advertisement by the third frame 2 of the PLI 1. The MS03 receives the paging advertisement by the fourth frame 3 of the PLI 1.

The BS also does the same modulo arithmetic that is described above, and determines frames of frames 0 through 3 by which it transmits the paging advertisements including TempID of the MS00 through MS03. For example, when the BS receives from the paging controller a paging advertisement transmission request including TempID of an MS to which a call is made, the BS does modulo arithmetic on the basis of the received TempID and determines which of the frames 0 through 3 the BS uses for transmitting a paging advertisement including the received TempID.

To be more concrete, it is assumed that the BS receives from the paging controller a paging advertisement transmission request including TempID=1. In this case, the BS does the same modulo arithmetic that is done by the MS00 through MS03, and determines that the BS transmits a paging advertisement including TempID=1 by the frame 1.

Paging advertisements PGADV00 through PGADV03 indicate that they include TempID by which the modulo arithmetic results "0" through "3", respectively, are obtained. For example, the paging advertisement PGADV00 indicates that it includes TempID=0, 4, and so on by which the modulo arithmetic result "0" is obtained. The paging advertisement PGADV01 indicates that it includes TempID=1, 5, and so on by which the modulo arithmetic result "1" is obtained.

In the example of FIG. 3, paging is performed for all of the MS00 through MS03 and the paging advertisements PGADV00 through PGADV03 are transmitted by the frames 0 through 3 respectively. For example, however, paging may be performed only for the MS00. In this case, only the paging advertisement PGADV00 is transmitted by the frame 0 and the paging advertisements PGADV01 through PGADV03 are not transmitted by the frames 1 through 3 respectively. Furthermore, if paging is performed for, for example, the MS00 and an MSO4 (not illustrated) to which TempID=4 is assigned, only the paging advertisement PGADV00 including the two identifiers, that is to say, TempID=0 and 4 is transmitted by the frame 0.

The operation indicated in FIG. 3 will now be described. It is assumed that calls are made to all of the MS00 through MS03 and that before the MS00 through MS03 enter the idle mode, TempID=0 through 3 are assigned to the MS00 through MS03, respectively, by the paging controller. The MS00 through MS03 do the above modulo arithmetic on the basis of TempID=0 through 3 assigned thereto, and determine which of the frames 0 through 3 in the superframe they use for receiving the paging advertisements.

(Step S1)

The BS receives from the paging controller a request to transmit paging advertisements to the MS00 through MS03. At this time the BS receives TempID=0 through 3 assigned to the MS00 through MS03 respectively. The BS does the above modulo arithmetic on the basis of TempID=0 through 3 received, and determines which of frames 0 through 3 in a superframe it uses for transmitting the paging advertisements.

(Step S2)

In accordance with the determination made in step S1, the BS transmits the paging advertisement PGADV00 including TempID=0 by the frame 0.

The MS00 does the above modulo arithmetic and receives the paging advertisement PGADV00 by the frame 0. The paging advertisement PGADV00 received by the MS00 includes TempID=0 assigned thereto, so the MS00 returns from the idle mode to the ordinary state.

(Step S3)

In accordance with the determination made in step S1, the BS transmits the paging advertisement PGADV01 including TempID=1 by the frame 1.

The MS01 does the above modulo arithmetic and receives the paging advertisement PGADV01 by the frame 1. The paging advertisement PGADV01 received by the MS01 includes TempID=1 assigned thereto, so the MS01 returns from the idle mode to the ordinary state.

(Step S4)

In accordance with the determination made in step S1, the BS transmits the paging advertisement PGADV02 including TempID=2 by the frame 2.

The MS02 does the above modulo arithmetic and receives the paging advertisement PGADV02 by the frame 2. The paging advertisement PGADV02 received by the MS02 includes TempID=2 assigned thereto, so the MS02 returns from the idle mode to the ordinary state.

(Step S5)

In accordance with the determination made in step S1, the BS transmits the paging advertisement PGADV03 including TempID=3 by the frame 3.

The MS03 does the above modulo arithmetic and receives the paging advertisement PGADV03 by the frame 3. The paging advertisement PGADV03 received by the MS03 includes TempID=3 assigned thereto, so the MS03 returns from the idle mode to the ordinary state.

Paging operation performed in the case of there being a relay station will now be described.

Figure 4:
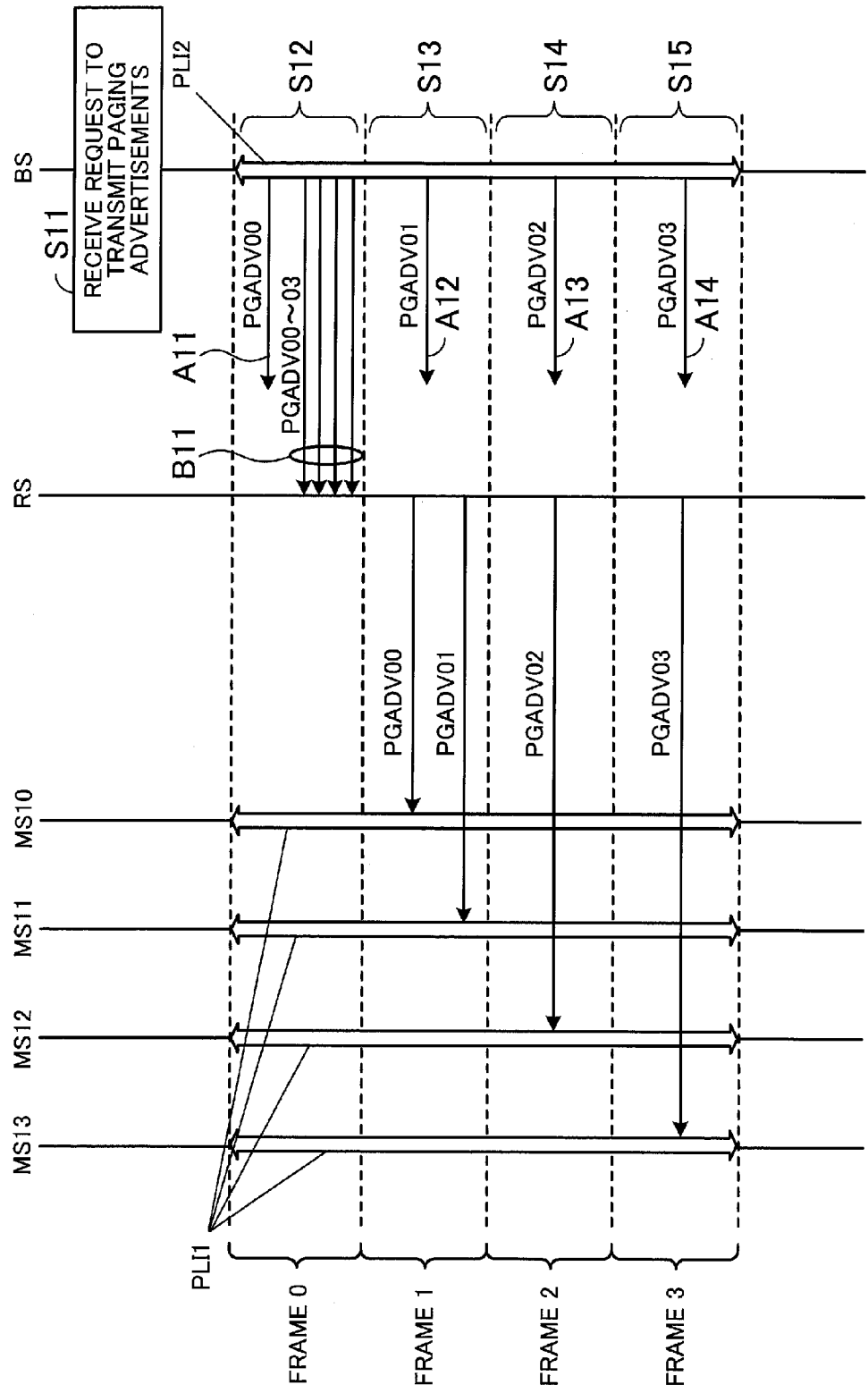
FIG. 4 is a sequence diagram of paging operation performed in the case of there being a relay station.

FIG. 4 is a sequence diagram of paging operation performed in the case of there being a relay station. FIG. 4 indicates the sequence of the operation of a base station, a relay station, and mobile stations. Hereinafter a relay station may be referred to as an RS (Relay Station).

In FIG. 4, TempID=0 through 3 are assigned to MS10 through MS13 respectively. All the MS10 through MS13 set PLIs 1 which are equal in timing as paging receiving periods. Furthermore, there are cases where the MS10 through MS13 are under the control of the BS. Accordingly, in order to transmit paging advertisements to the MS10 through MS13 under the control of the BS, the BS sets a PLI 2 which is equal to the PLIs 1 in timing.

As stated above, the BS or the RS does not recognize the presence or absence of the MS10 through MS13 in its communication area. Accordingly, the BS and the RS transmit paging advertisements. That is to say, the BS broadcasts a paging advertisement in its communication area and transmits a paging advertisement to the RS so that the RS can broadcast a paging advertisement in its communication area.

To be concrete, as indicated by arrows A11 through A14 of FIG. 4, the BS assigns paging advertisements PGADV00 through PGADV03 including TempID of the MS10 through MS13 to frames 0 through 3, respectively, and transmits the paging advertisements PGADV00 through PGADV03 to the MS10 through MS13, respectively, which are under the control of the BS.

In addition, in order to transmit the paging advertisements PGADV00 through PGADV03 to the RS, the BS assigns all the paging advertisements PGADV00 through PGADV03 to a specific frame of the four frames and transmits the paging advertisements PGADV00 through PGADV03 to the RS. For example, as indicated by an arrow B11 of FIG. 4, the BS assigns all the paging advertisements PGADV00 through PGADV03 to the leading frame 0.

The RS receives the paging advertisements PGADV00 through PGADV03 from the BS by the frame 0, so the RS cannot transmit by the frame 0 the paging advertisement PGADV00 including TempID=0, 4, and so on which is to be transmitted by the frame 0. Accordingly, the RS assigns the paging advertisement PGADV00 to the frames 1 through 3 other than the frame 0 to transmit the paging advertisement PGADV00. For example, as indicated in FIG. 4, the RS assigns the paging advertisement PGADV00 to the frame 1 to transmit the paging advertisement PGADV00.

As described in FIG. 3, the MS10 through MS13 do modulo arithmetic on the basis of TempID and determine frames of the frames 0 through 3 by which they are to receive the paging advertisements. When the MS10 through MS13 are in the communication area of the BS, the same frames that are used by the MS10 through MS13 for receiving the paging advertisements are used by the BS for transmitting the paging advertisements.

However, when the MS10 through MS13 are in the communication area of the RS, frames used by the MS10 through MS13 for receiving the paging advertisements may not be the same as frames used by the BS for transmitting the paging advertisements. In the case of the above example, for example, the paging advertisement PGADV00 to be received by the MS10 is transmitted not by the frame 0 but by the frame 1. Accordingly, the MS10 which is to receive the paging advertisement by the specific frame 0 receives the paging advertisement by the frame 1.

On the other hand, the MS11 through MS13 which are not to receive the paging advertisements by the specific frame 0 receive the paging advertisements PGADV01 through PGADV03 by the frames 1 through 3, respectively, which the MS11 through MS13 determine by doing the modulo arithmetic.

The BS determines in advance a specific frame used for transmitting paging advertisements to the RS. Furthermore, the RS determines in advance a second frame used for transmitting a paging advertisement which is to be transmitted to an MS under its control by the specific frame. As a result, the MS which is in the communication area of the RS and which is to receive the paging advertisement by the specific frame can receive the paging advertisement by the second frame determined in advance.

In addition, the MS10 through MS13 can determine from preambles of the frames 0 through 3 transmitted from the BS or the RS which of the communication areas of the BS and the RS they are in.

The operation indicated in FIG. 4 will now be described. It is assumed that calls are made to all of the MS10 through MS13, that the MS10 through MS13 are in the communication area of the RS, and that before the MS10 through MS13 enter the idle mode, TempID=0 through 3 are assigned to the MS10 through MS13, respectively, by a paging controller. In addition, the MS10 through MS13 do the above modulo arithmetic on the basis of TempID=0 through 3 assigned thereto, and determine which of the frames 0 through 3 in a superframe they use for receiving the paging advertisements. Furthermore, it is assumed that the BS determines that the frame 0 is a specific frame, and that the BS transmits all the paging advertisements PGADV00 through PGADV03 to the RS by the frame 0. Moreover, it is assumed that the RS assigns the paging advertisement which is to be transmitted by the specific frame 0 to the frame 1 for transmission.

(Step S11)

The BS receives from the paging controller a request to transmit paging advertisements to the MS10 through MS13. At this time the BS receives TempID=0 through 3 assigned to the MS10 through MS13 respectively. The BS does the above modulo arithmetic on the basis of TempID=0 through 3 received, and determines which of the frames 0 through 3 in a superframe the BS uses for transmitting the paging advertisements PGADV00 through PGADV03.

(Step S12)

When the PLI 2 comes, the BS transmits by the frame 0 the paging advertisement PGADV00 including TempID=0 and the paging advertisements PGADV00 through PGADV03 including TempID=0 through 3 respectively. The paging advertisement PGADV00 indicated by the arrow A11 is broadcast to MSes. The paging advertisements PGADV00 through PGADV03 indicated by the arrow B11 are transmitted to the RS.

The MS10 through MS13 are not under the control of the BS, so the paging advertisement PGADV00 including TempID=0 is not received by the MS10. Furthermore, the BS may generate the paging advertisements PGADV00 through PGADV03 to be transmitted to the RS as one paging advertisement, and transmit the paging advertisement to the RS. In this case, the RS generates the paging advertisements PGADV00 through PGADV03 from the one paging advertisement received.

(Step S13)

The BS transmits the paging advertisement PGADV01 by the frame 1. The RS transmits by the frame 1 the paging advertisement PGADV01 received from the BS. In addition, the RS cannot transmit by the frame 0 the paging advertisement PGADV00 received from the BS, so the RS transmits the paging advertisement PGADV00 by the frame 1.

The MS10 and the MS11 under the control of the RS receive the paging advertisements PGADV00 and PGADV01, respectively, by the frame 1.

(Step S14)

The BS transmits the paging advertisement PGADV02 by the frame 2. The RS transmits by the frame 2 the paging advertisement PGADV02 received from the BS.

The MS12 under the control of the RS receives the paging advertisement PGADV02 transmitted from the RS by the frame 2.

(Step S15)

The BS transmits the paging advertisement PGADV03 by the frame 3. The RS transmits by the frame 3 the paging advertisement PGADV03 received from the BS.

The MS13 under the control of the RS receives the paging advertisement PGADV03 transmitted from the RS by the frame 3.

The RS does the same modulo arithmetic that is done by the BS, and can determine, on the basis of TempID included in the paging advertisements PGADV00 through PGADV03 received from the BS, frames by which the RS transmits the paging advertisements PGADV00 through PGADV03 received from the BS. However, the RS transmits the paging advertisement PGADV00 which is to be transmitted by a specific frame by a frame other than the specific frame which is determined in advance. The RS may assign the paging advertisements PGADV01 through PGADV03 received from the BS to the determined frames 1 through 3, respectively, for transmission.

Figure 5:
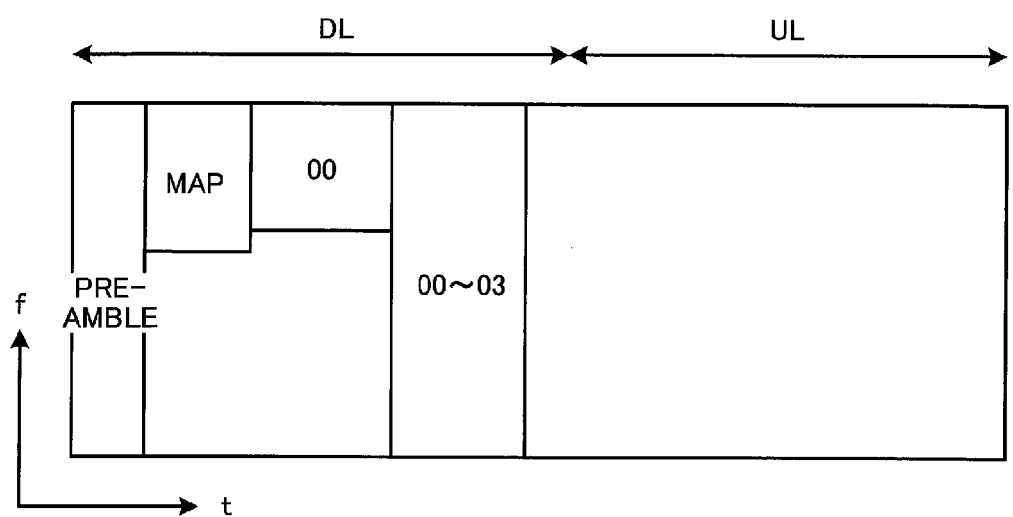
FIG. 5 is a first example of the structure of a frame.

FIG. 5 is a first example of the structure of a frame. A frame illustrated in FIG. 5 corresponds to, for example, the frame 0 transmitted by the BS in FIG. 4. In FIG. 5, a horizontal axis indicates time and a vertical axis indicates a frequency.

As illustrated in FIG. 5, a frame is divided into a DL (DownLink) subframe and a UL (UpLink) subframe. The DL subframe is used for transmitting data from the BS to the RS and from the RS to an MS. The UL subframe is used for transmitting data from an MS to the RS and from the RS to the BS. A detailed description of the UL subframe will be omitted.

A preamble area is formed at the head of the frame. The preamble area includes synchronization information and information which indicates whether the frame is transmitted from the BS or the RS. Accordingly, an MS can determine, from data in the preamble area, whether it is under the control of the BS or the RS.

A map area is formed behind the preamble area. The map area includes information indicative of the kind of information and an area in the DL subframe where the information is included. For example, the map area includes information which indicates that a "00" area illustrated in FIG. 5 is used for transmitting data to the MS10 that is under the control of the BS (MS10 is under the control of the RS in the example of FIG. 4) and information which indicates that "00 through 03" areas are used for transmitting data to the RS.

The paging advertisement PGADV00 transmitted to an MS under the control of the BS is stored in the "00" area. The paging advertisements PGADV00 through PGADV03 transmitted to the RS are stored in the "00 through 03" areas. As a result, as indicated by, for example, the arrows A11 and B11 of FIG. 4, the paging advertisement PGADV00 can be transmitted to the MS under the control of the BS, and the paging advertisements PGADV00 through PGADV03 can be transmitted to the RS.

Figure 6:
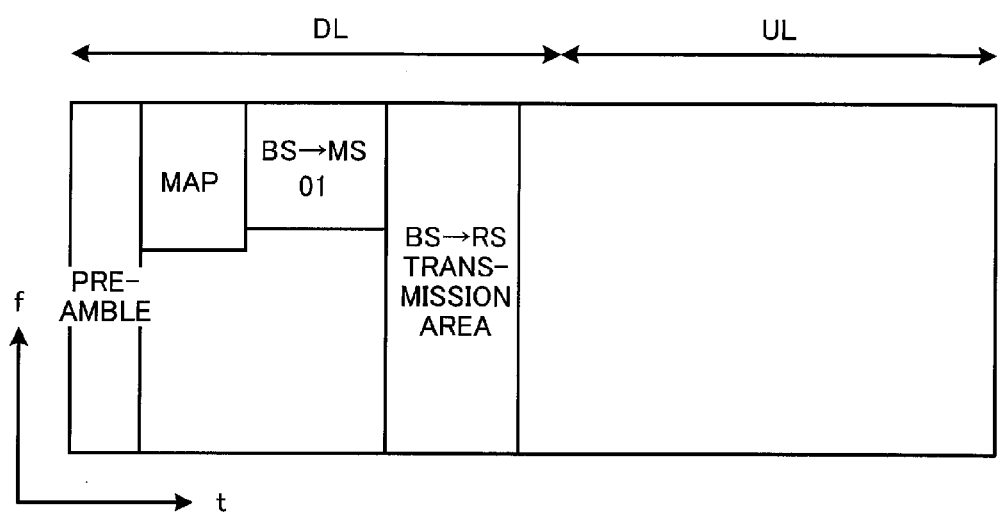
FIG. 6 is a second example of the structure of a frame.
Figure 7:
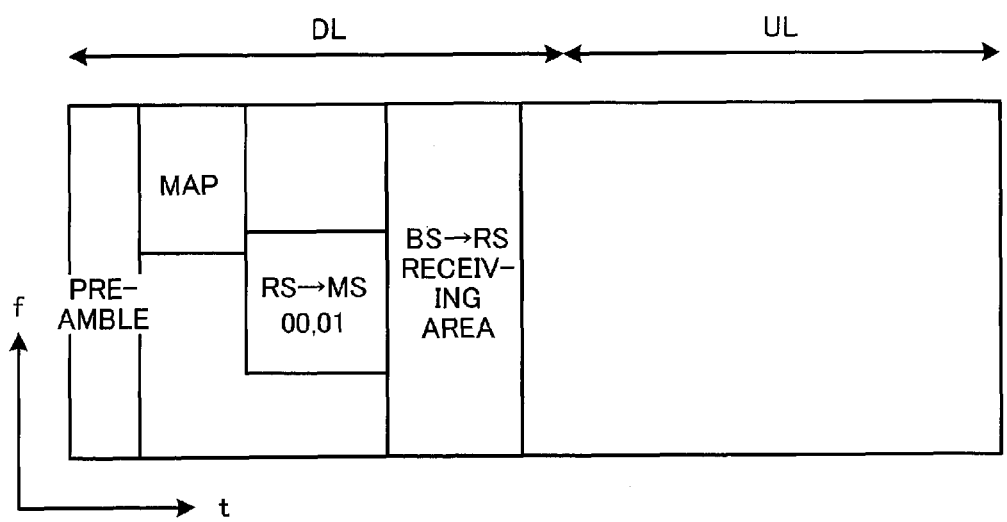
FIG. 7 is a second example of the structure of a frame.

FIGS. 6 and 7 are second examples of the structure of a frame. A frame illustrated in FIG. 6 corresponds to, for example, the frame 1 transmitted by the BS in FIG. 4. Furthermore, a frame illustrated in FIG. 7 corresponds to, for example, the frame 1 transmitted by the RS in FIG. 4.

The frame 1 is used for transmitting data from the BS to an MS under the control of the BS and transmitting data from the RS to the MSes under the control of the RS. As illustrated in FIG. 6, a DL subframe in a frame transmitted by the BS includes an area used for transmitting data from the BS to an MS under the control of the BS (indicated by "BS→MS" in FIG. 6) and an area used for transmitting data from the BS to the RS (indicated by "BS→RS transmission area" in FIG. 6).

The area used for transmitting data from the BS to an MS under the control of the BS is used for transmitting the paging advertisement PGADV01 from the BS to the MS. On the other hand, as illustrated in FIG. 7, a DL subframe in a frame transmitted by the RS includes an area used for transmitting data from the RS to an MS under the control of the RS (indicated by "RS→MS" in FIG. 7) and an area used for receiving data transmitted from the BS (indicated by "BS→RS receiving area" in FIG. 7). The area used for transmitting data from the RS to an MS under the control of the RS is used for transmitting the paging advertisements PGADV00 and PGADV01 from the RS to the MSes.

Figure 8:
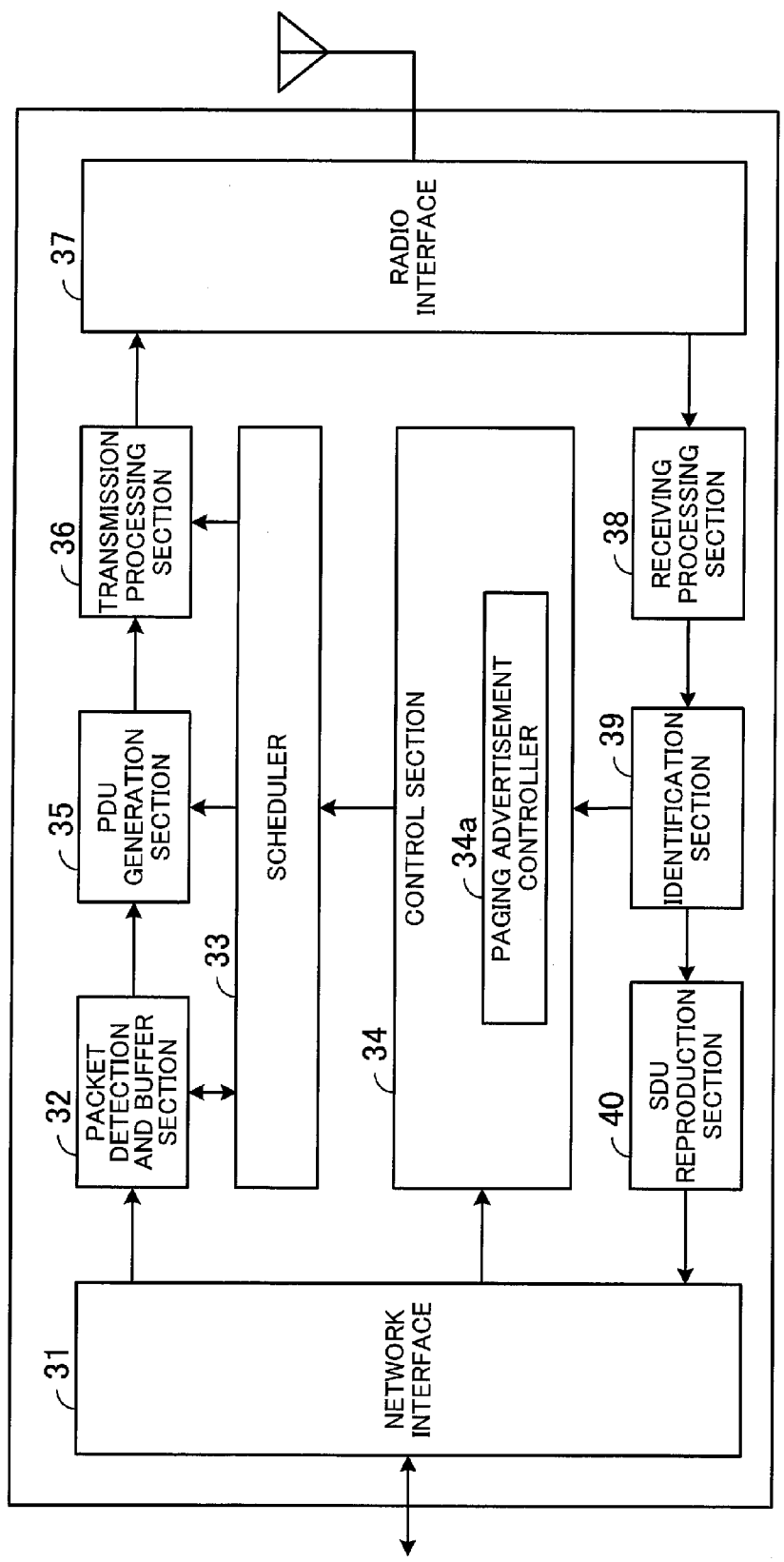
FIG. 8 is a block diagram of a base station.

FIG. 8 is a block diagram of the base station. As illustrated in FIG. 8, the base station includes a network interface 31, a packet detection and buffer section 32, a scheduler 33, a control section 34, a PDU (Protocol Data Unit) generation section 35, a transmission processing section 36, a radio interface 37, a receiving processing section 38, an identification section 39, and an SDU (Service Data Unit) reproduction section 40. The control section 34 includes a paging advertisement controller 34a.

The network interface 31 transmits or receives data regarding communication with a mobile station and a control message, such as a paging request from a paging controller, via a carrier network which is an upper network.

The packet detection and buffer section 32 holds a downlink packet a destination of which is a user (mobile station) received via the network interface 31. The packet detection and buffer section 32 detects packets according to mobile stations and connections and holds them in a buffer as SDUs.

The scheduler 33 performs scheduling of the SDUs held by the packet detection and buffer section 32. In addition, the scheduler 33 performs mobile station assignment in the UL direction on the basis of a control message from the control section 34. Furthermore, the scheduler 33 performs scheduling of paging advertisements PGADV generated by the paging advertisement controller 34a of the control section 34. The scheduler 33 performs data scheduling and generates map information.

The control section 34 generates control messages for controlling a mobile station and a relay station.

The paging advertisement controller 34a of the control section 34 generates a paging advertisement PGADV in response to a paging advertisement transmission request from the paging controller received by the network interface 31. For example, the paging advertisement controller 34a does modulo arithmetic on the basis of TempID included in the paging advertisement transmission request, and generates paging advertisements PGADV00 through PGADV03 including TempID. The paging advertisement PGADV00 includes TempID which gives the modulo arithmetic result "0". Similarly, the paging advertisement PGADV03 includes TempID which gives the modulo arithmetic result "3".

When a PLI comes, the scheduler 33 assigns the paging advertisements PGADV00 through PGADV03 generated by the paging advertisement controller 34a to frames 0 through 3, respectively, of the PLI. In addition, the scheduler 33 assigns all of the paging advertisements PGADV00 through PGADV03 generated by the paging advertisement controller 34a to, for example, the specific frame 0 of the PLI.

The PDU generation section 35 converts the SDUs held by the packet detection and buffer section 32 and the paging advertisement generated by the paging advertisement controller 34a to PDUs for WiMAX. For example, the PDU generation section 35 adds a MAC (Media Access Control) header and CRC (Cyclic Redundancy Checking) and performs fragmentation and packing.

The transmission processing section 36 codes and modulates the PDUs generated by the PDU generation section 35, and generates radio frames on the basis of scheduling by the scheduler 33.

The radio interface 37 converts data outputted from the transmission processing section 36 to radio signals and transmits them to mobile stations under the control of the base station and a relay station. In addition, the radio interface 37 receives radio signals from the mobile stations under the control of the base station and the relay station. The radio interface transmits or receives a radio frame according to OFDMA (Orthogonal Frequency Division Multiple Access) in accordance with, for example, IEEE Draft P802.16m.

The receiving processing section 38 extracts a received frame from a radio signal received by the radio interface 37, and performs demodulation and decoding.

The identification section 39 separates a control message and user data. The control message is outputted to the control section 34 and the user data is outputted to the SDU reproduction section 40.

The SDU reproduction section 40 converts the user data identified by the identification section 39 to an SDU such as an IP (Internet Protocol) packet. For example, the SDU reproduction section 40 performs defragmentation and depacking of the user data and removes a MAC header and CRC. The SDU is transferred to an upper network by the network interface 31.

Figure 9:
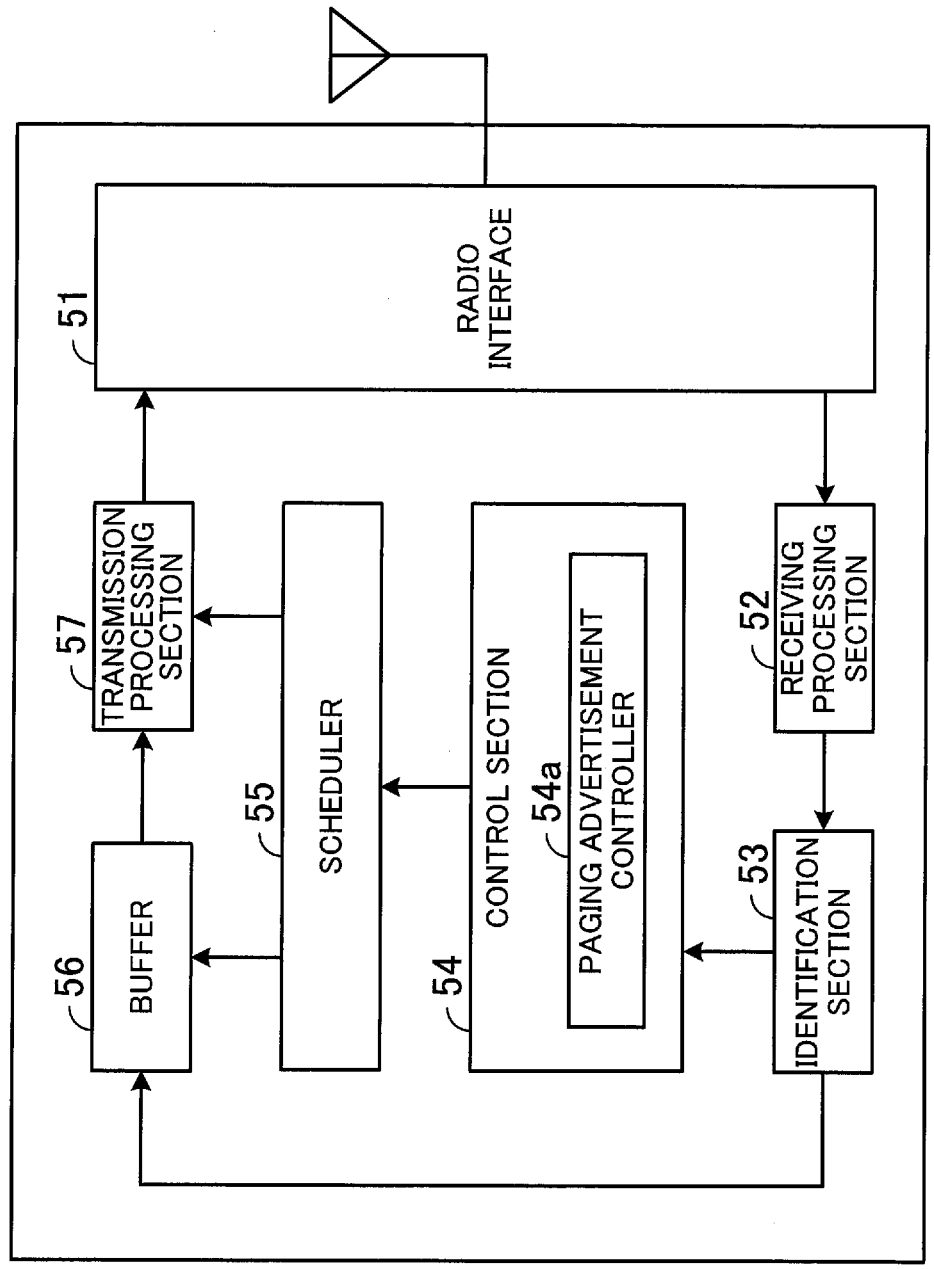
FIG. 9 is a block diagram of a relay station.

FIG. 9 is a block diagram of the relay station. As illustrated in FIG. 9, the relay station includes a radio interface 51, a receiving processing section 52, an identification section 53, a control section 54, a scheduler 55, a buffer 56, and a transmission processing section 57. The control section 54 includes a paging advertisement controller 54a.

The radio interface 51 converts data outputted from the transmission processing section 57 to radio signals and transmits them to mobile stations under the control of the relay station and the base station. In addition, the radio interface 51 receives radio signals from the mobile stations under the control of the relay station and the base station. The radio interface 51 transmits or receives a radio frame based on OFDMA in accordance with, for example, IEEE Draft P802.16m.

The receiving processing section 52 extracts a received frame from a radio signal received by the radio interface 51, and performs demodulation and decoding.

The identification section 53 separates a control message and user data. The control message is outputted to the control section 54 and the user data is outputted to the buffer 56.

The control section 54 generates a control message for controlling a mobile station.

When paging advertisements transmitted by a BS-RS transmission area in a BS transmission frame are outputted from the identification section 53, the paging advertisement controller 54a of the control section 54 recognizes that the frame is a specific frame. The paging advertisement controller 54a outputs the extracted paging advertisements to the scheduler 55.

The scheduler 55 performs scheduling of the user data held by the buffer 56. In addition, the scheduler 55 performs mobile station assignment in the UL direction on the basis of a control message from the control section 54.

Furthermore, the scheduler 55 performs scheduling of the paging advertisements PGADV extracted by the paging advertisement controller 54a. For example, the scheduler 55 assigns paging advertisements PGADV00 through PGADV03 transmitted from the BS to frames other than the specific frame of a PLI. To be more concrete, the paging advertisement PGADV00 which is to be transmitted to a mobile station by the specific frame can be transmitted to the mobile station by the specific frame no longer. Accordingly, the scheduler 55 assigns the paging advertisement PGADV00 to a frame 1 other than the specific frame which is determined in advance.

The scheduler 55 assigns paging advertisements other than a paging advertisement which is to be transmitted by the specific frame to frames on the basis of modulo arithmetic results. For example, the scheduler 55 assigns the paging advertisement PGADV01 including TempID=1, 5, 9, and so on which give the modulo arithmetic result "1" to the frame 1.

The buffer 56 holds the user data outputted from the identification section 53.

The transmission processing section 57 codes and modulates the user data held by the buffer 56, and generates a radio frame on the basis of scheduling by the scheduler 55.

Figure 10:
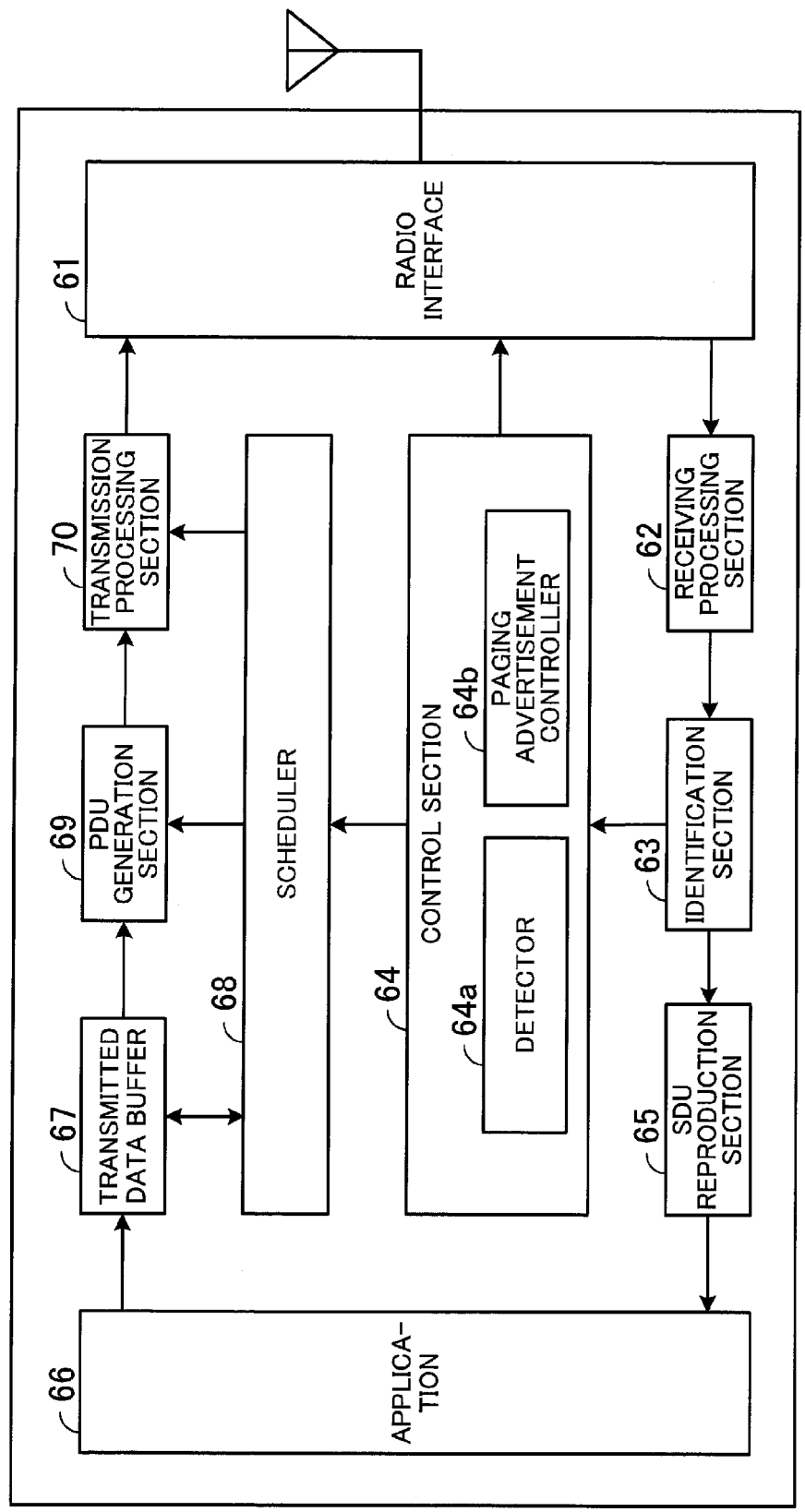
FIG. 10 is a block diagram of a mobile station.

FIG. 10 is a block diagram of a mobile station. As illustrated in FIG. 10, a mobile station includes a radio interface 61, a receiving processing section 62, an identification section 63, a control section 64, an SDU reproduction section 65, an application 66, a transmitted data buffer 67, a scheduler 68, a PDU generation section 69, and a transmission processing section 70. The control section 64 includes a detector 64a and a paging advertisement controller 64b.

The radio interface 61 receives radio signals transmitted from the base station and the relay station. In addition, the radio interface 61 converts data outputted from the transmission processing section 70 to radio signals and transmits them to the base station and the relay station. The radio interface 61 transmits or receives a radio frame based on OFDMA in accordance with, for example, IEEE Draft P802.16m.

The receiving processing section 62 extracts a received frame from a radio signal received by the radio interface 61, and performs demodulation and decoding.

The identification section 63 separates a control message and user data. The control message is outputted to the control section 64 and the user data is outputted to the SDU reproduction section 65.

The control section 64 generates a control message for controlling a mobile station.

The detector 64a of the control section 64 detects from a value of a preamble index included in a preamble area whether a received radio frame is transmitted from the base station or the relay station. That is to say, the detector 64a detects whether the mobile station is under the control of the base station or the relay station.

The paging advertisement controller 64b of the control section 64 manages information such as a cycle and an offset of a PLI in the idle mode and TempID. It is assumed that the mobile station enters the idle mode and that the detector 64a determines that the mobile station is under the control of the base station. In this case, the paging advertisement controller 64b controls the radio interface 61 according to a result of modulo arithmetic done on the basis of TempID so that it will receive a determined frame of the PLI. For example, if a result of modulo arithmetic is "0", then the paging advertisement controller 64b controls the radio interface 61 so that it will receive a frame 0.

Furthermore, it is assumed that the paging advertisement controller 64b determines, as a result of modulo arithmetic based on TempID, that the mobile station receives a paging advertisement by a specific frame. In this case, if the mobile station enters the idle mode and the detector 64a determines that the mobile station is under the control of the relay station, then the paging advertisement controller 64b controls the radio interface 61 so that it will receive a frame other than the specific frame which is determined in advance.

For example, it is assumed that the specific frame is the frame 0 and that a result of modulo arithmetic done by the paging advertisement controller 64b is "0". The radio interface 61 should originally receive the paging advertisement by the frame 0. In this case, however, the paging advertisement controller 64b controls the radio interface 61 so that it will receive the paging advertisement by a frame 1 other than the frame 0 which is determined in advance.

The SDU reproduction section 65 converts the user data identified by the identification section 63 to an SDU such as an IP packet. For example, the SDU reproduction section 65 performs defragmentation and depacking of the user data and removes a MAC header and CRC. The SDU is outputted to the application 66.

The application 66 performs, for example, a determined process on the SDU outputted from the SDU reproduction section 65 to show it on a display. Furthermore, the application 66 outputs to the transmitted data buffer 67 data to be transmitted to another mobile station or a network device.

The transmitted data buffer 67 holds the data outputted from the application 66.

The scheduler 68 assigns the data held by the transmitted data buffer 67 to a frame area assigned by the base station.

The PDU generation section 69 converts an SDU held by the transmitted data buffer 67 and a message generated by the control section 64 to WiMAX PDUs. For example, the PDU generation section 69 adds a MAC header and CRC and performs fragmentation and packing.

The transmission processing section 70 codes and modulates the PDUs generated by the PDU generation section 69, and generates a radio frame on the basis of scheduling by the scheduler 68.

As has been described, the base station assigns paging advertisements to be transmitted to mobile stations to a plurality of frames of a PLI, and assigns the paging advertisements to a specific frame of the plurality of frames of the PLI to transmit the paging advertisements to the relay station. The relay station receives the paging advertisements from the base station by the specific frame and transmits the received paging advertisements to the mobile stations by frames other than the specific frame which are determined in advance. The mobile stations are under the control of the relay station. A paging advertisement which is to be received by the specific frame is received by a frame determined in advance.

As a result, there is no need for the base station to manage a PLI in which a time lag that occurs in the relay station is taken into consideration. The base station can transmit paging advertisements to the relay station and transmit paging advertisements to mobile stations in its communication area. Accordingly, the control on the base station can be reduced.

Furthermore, a mobile station which is in a communication area of the relay station and which is to receive a paging advertisement by a specific frame receives the paging advertisement by a frame other than the specific frame which is determined in advance. As a result, power consumption can be reduced.

A third embodiment will now be described in detail with reference to the accompanying drawing. In the second embodiment the relay station transmits a paging advertisement which is to be transmitted by a specific frame to a mobile station by a frame other than the specific frame which is determined in advance. In FIG. 4, for example, the RS transmits the paging advertisement PGADV00 which is to be transmitted by the frame 0 by the frame 1 which is determined in advance. In the third embodiment a relay station assigns a paging advertisement which is to be assigned to a specific frame for transmission to a free frame to which no paging advertisement is assigned, and transmits it to a mobile station in its communication area.

Figure 11:
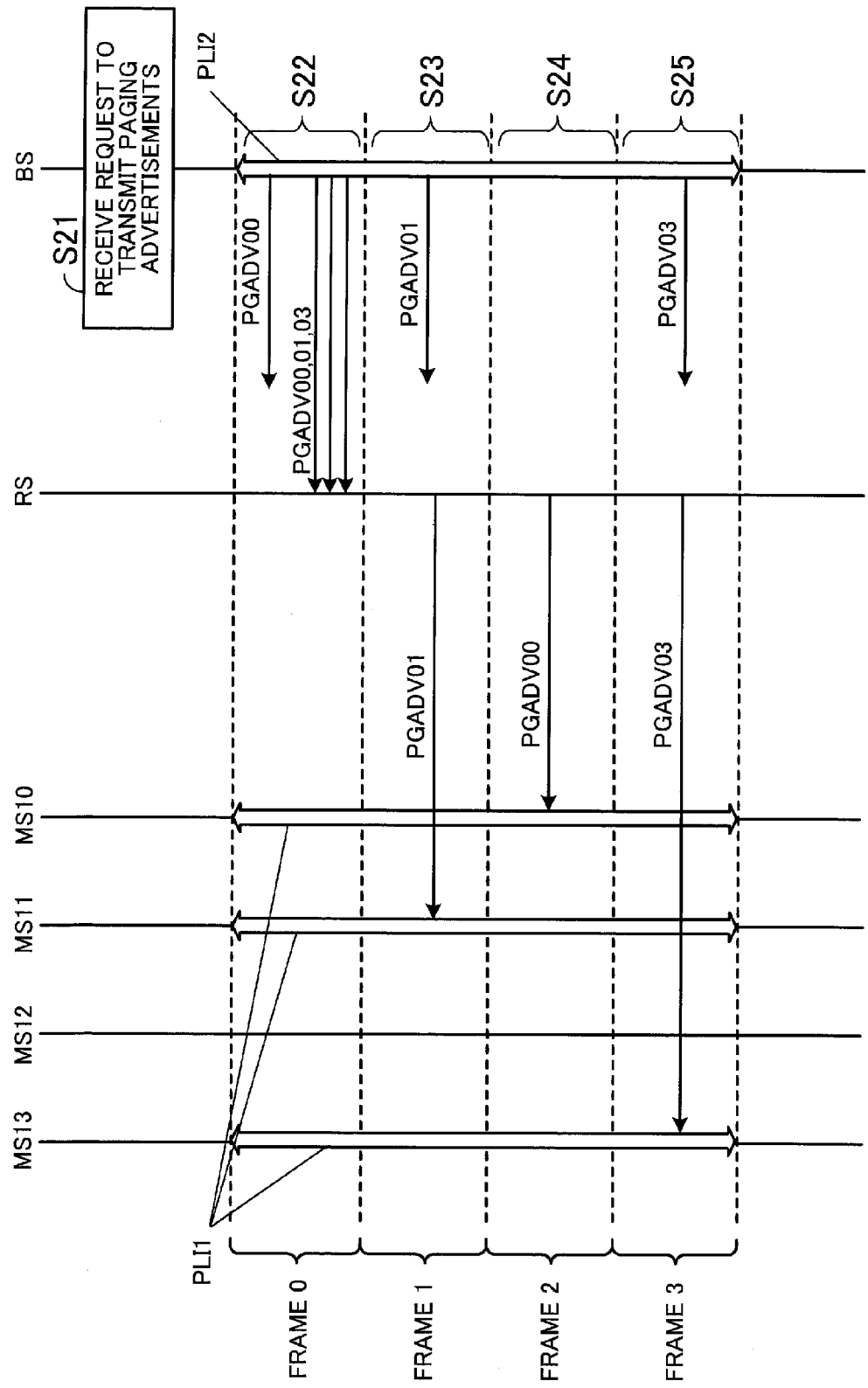
FIG. 11 is a sequence diagram of operation performed in a communication system according to a third embodiment.

FIG. 11 is a sequence diagram of operation performed in a communication system according to a third embodiment. FIG. 11 indicates the sequence of the operation of a BS, an RS, and MS10 through MS13. In FIG. 11, it is assumed that the MS10 through MS13 are in a communication area of the RS. Furthermore, it is assumed that the MS10, the MS11, and the MS13 are in the idle mode and that before the MS10, the MS11, and the MS13 enter the idle mode, TempID=0, 1, and 3 are assigned to the MS10, the MS11, and the MS13, respectively, by a paging controller. In addition, the MS10, the MS11, and the MS13 do the above modulo arithmetic on the basis of TempID=0, 1, and 3 assigned thereto, and determine which of frames 0 through 3 in a superframe they use for receiving paging advertisements. Furthermore, it is assumed that the BS transmits all paging advertisements PGADV00, PGADV01, and PGADV03 to the RS by the frame 0 with the frame 0 as a specific frame.

(Step S21)

The BS receives from the paging controller a request to transmit paging advertisements to the MS10, the MS 11, and the MS13. At this time the BS receives TempID=0, 1, and 3 assigned to the MS10, the MS11, and the MS13 respectively. The BS does the above modulo arithmetic on the basis of TempID=0, 1, and 3 received, and determines which of the frames 0 through 3 in the superframe it uses for transmitting the paging advertisements PGADV00, PGADV01, and PGADV03. In the example of FIG. 11, the BS determines that it transmits the paging advertisements PGADV00, PGADV01, and PGADV03 to MSes in its communication area by the frames 0, 1, and 3 respectively.

(Step S22)

When a PLI 2 comes, the BS transmits by the frame 0 the paging advertisement PGADV00 including TempID=0 and the paging advertisements PGADV00, PGADV01, and PGADV03 including TempID=0, 1, and 3 respectively.

The MS10 through MS13 are not under the control of the BS, so the paging advertisement PGADV00 including TempID=0 is not received by the MS10. Furthermore, the BS may generate the paging advertisements PGADV00, PGADV01, and PGADV03 to be transmitted to the RS as one paging advertisement, and transmit the paging advertisement to the RS. In this case, the RS generates the paging advertisements PGADV00, PGADV01, and PGADV03 from the one paging advertisement received.

(step S23)

The BS transmits the paging advertisement PGADV01 by the frame 1. The RS transmits by the frame 1 the paging advertisement PGADV01 received from the BS.

The MS11 under the control of the RS receives the paging advertisement PGADV01 by the frame 1.

(Step S24)

There is no paging advertisement PGADV02 which is to be transmitted by the frame 2, so the BS does not transmit a paging advertisement by the frame 2. The RS detects that there is no paging advertisement PGADV02 to be transmitted to the MS12 by the frame 2, and transmits by the frame 2 the paging advertisement PGADV00 which is to be transmitted to the MS10 by the specific frame 0. That is to say, the RS detects a free frame and transmits the paging advertisement PGADV00 by the free frame.

The MS10 under the control of the RS receives the paging advertisement PGADV00 by the frame 2.

The MS10 which is to receive the paging advertisement PGADV00 by the specific frame 0 cannot recognize a frame other than the specific frame 0 of the frames 1 through 3 which the RS uses for transmitting the paging advertisement PGADV00. Accordingly, the MS10 receives all of the frames 1 through 3 other than the specific frame 0 and receives the paging advertisement PGADV00 including its TempID.

In FIG. 11, the frame 2 is a free frame. However, there is a case where the frames 1 and 3 are free frames. In this case, the RS transmits the paging advertisement PGADV00 by one of the frames 1 and 3.

(Step S25)

The BS transmits the paging advertisement PGADV03 by the frame 3. The RS transmits by the frame 3 the paging advertisement PGADV03 received from the BS.

The MS13 under the control of the RS receives by the frame 3 the paging advertisement PGADV03 transmitted from the RS.

The RS can determine frames by which it transmits the paging advertisements PGADV00, PGADV01, and PGADV03 received from the BS by doing the same modulo arithmetic that is done by the BS on the basis of TempID included in the paging advertisements PGADV00, PGADV01, and PGADV03 received from the BS. If there is a free frame, then the RS assigns a paging advertisement which is to be transmitted by a specific frame to the free frame, and transmits the paging advertisement to an MS. As described in the second embodiment, if there is no free frame, then the RS transmits the paging advertisement by a frame other than the specific frame which is determined in advance.

A block diagram of the base station is the same as that indicated in FIG. 8. A block diagram of the relay station is the same as that indicated in FIG. 9, but a scheduler 55 in the third embodiment differs from the scheduler 55 illustrated in FIG. 9 in function. A block diagram of a mobile station is the same as that indicated in FIG. 10, but a paging advertisement controller 64b in the third embodiment differs from the paging advertisement controller 64b illustrated in FIG. 10 in function.

The scheduler 55 of the relay station according to the third embodiment assigns paging advertisements other than a paging advertisement which is to be transmitted by a specific frame to frames determined by doing modulo arithmetic. If there is a free frame (to which no paging advertisement is assigned), then the scheduler 55 assigns the paging advertisement PGADV00 which is to be transmitted to the mobile station by the specific frame 0 to the free frame. As described in the second embodiment, if there is no free frame, then the scheduler 55 assigns the paging advertisement PGADV00 to one of the frames 1 through 3 which is determined in advance.

It is assumed that the paging advertisement controller 64b of the mobile station according to the third embodiment determines, as a result of modulo arithmetic based on TempID, that the mobile station receives a paging advertisement by a specific frame. In this case, if the mobile station enters the idle mode and a detector 64a determines that the mobile station is under the control of the relay station, then the paging advertisement controller 64b controls a radio interface 61 so that it will receive all the frames other than the specific frame. As a result, the paging advertisement PGADV00 is received.

For example, it is assumed that a specific frame is the frame 0 and that a result of modulo arithmetic done by the paging advertisement controller 64b is "0". In this case, the mobile station is originally to receive a paging advertisement by the frame 0. However, in order to receive the paging advertisement PGADV00, the paging advertisement controller 64b controls the radio interface 61 so that it will receive all the frames 1 through 3 other than the frame 0. That is to say, in order to receive the paging advertisement PGADV00, the paging advertisement controller 64*b* attempts receiving all the frames 1 through 3 other than the specific frame 0.

As has been described, the relay station assigns a paging advertisement which is to be assigned to a specific frame for transmission to a free frame to which no paging advertisement is assigned, and transmits the paging advertisement to a mobile station in its communication area. By doing so, the relay station can use a free frame other than the specific frame for transmitting the paging advertisement to the mobile station under its control.

A fourth embodiment will now be described in detail with reference to the accompanying drawing. In the third embodiment the relay station assigns a paging advertisement which is to be assigned to a specific frame for transmission to a free frame to which no paging advertisement is assigned, and transmits the paging advertisement to a mobile station in its communication area. In FIG. 11, for example, the relay station transmits by the free frame 2 the paging advertisement PGADV00 which is to be transmitted by the specific frame 0. In the fourth embodiment a relay station assigns a paging advertisement which is to be assigned to a specific frame for transmission to a frame other than the specific frame in which the data size of a paging advertisement is the smallest, and transmits the paging advertisement to a mobile station in its communication area.

Figure 12:
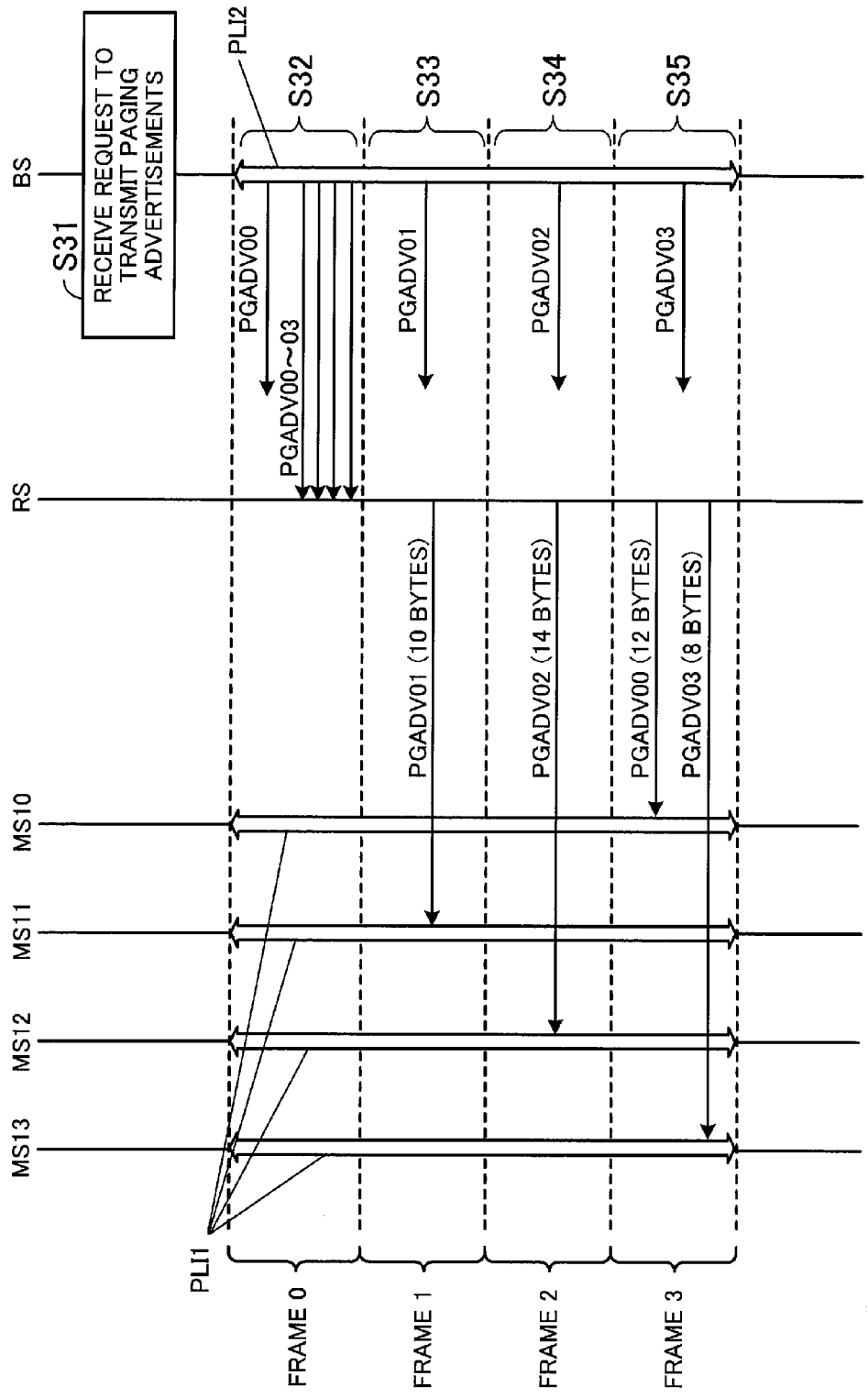
FIG. 12 is a sequence diagram of operation performed in a communication system according to a fourth embodiment.

FIG. 12 is a sequence diagram of operation performed in a communication system according to a fourth embodiment. FIG. 12 indicates the sequence of the operation of a BS, an RS, and MS10 through MS13. In FIG. 12, it is assumed that the MS10 through MS13 are in a communication area of the RS. Furthermore, it is assumed that the MS10 through MS13 are in the idle mode and that before the MS10 through MS13 enter the idle mode, TempID=0 through 3 are assigned to the MS10 through MS13, respectively, by a paging controller. In addition, the MS10 through MS13 do the above modulo arithmetic on the basis of TempID=0 through 3 assigned thereto, and determine which of frames 0 through 3 in a superframe they use for receiving paging advertisements. Furthermore, it is assumed that the BS transmits all paging advertisements PGADV00 through PGADV03 to the RS by the frame 0 with the frame 0 as a specific frame.

In FIG. 12, only four MSes are indicated. However, it is assumed that in addition to the MS10, there are two MSes which are under the control of the RS and for which the modulo arithmetic result "0" is obtained (to which TempID=4 and 8, for example, are assigned). Furthermore, it is assumed that in addition to the MS11, there is one MS which is under the control of the RS and for which the modulo arithmetic result "1" is obtained (to which TempID=5, for example, is assigned). Moreover, it is assumed that in addition to the MS12, there are three MSes which are under the control of the RS and for which the modulo arithmetic result "2" is obtained (to which TempID=6, 10, and 14, for example, are assigned). It is assumed that there is no MS other than the MS13 which is under the control of the RS and for which the modulo arithmetic result "3" is obtained.

The size of a paging advertisement changes according to the number of mobile stations which are included in the paging advertisement and to which calls are made. For example, it is assumed that the size of a header in a paging advertisement is 6 bytes and that the size of TempID of one mobile station is 2 bytes. In the case of the above example, there are three MSes for which the modulo arithmetic result "0" is obtained, so the size of the paging advertisement PGADV00 is 12 bytes. Furthermore, there are two MSes for which the modulo arithmetic result "1" is obtained, so the size of the paging advertisement PGADV01 is 10 bytes. Moreover, there are four MSes for which the modulo arithmetic result "2" is obtained, so the size of the paging advertisement PGADV02 is 14 bytes. In addition, there is one MS for which the modulo arithmetic result "3" is obtained, so the size of the paging advertisement PGADV03 is 8 bytes.

When the RS transmits the paging advertisements received from the BS to the MSes under its control, the RS calculates the size of the paging advertisements PGADV01 through PGADV03 to be transmitted by the frames other than the specific frame 0. On the basis of TempID included in the received paging advertisements, the RS can calculate the size of the paging advertisements. The RS assigns the paging advertisement PGADV00 which is to be assigned to the specific frame 0 for transmission to the frame 3 other than the specific frame 0 in which the data size of the paging advertisement is the smallest, and transmits the paging advertisement PGADV00 to the MS in its communication area.

(Step S31)

The BS receives from the paging controller a request to transmit paging advertisements to the MS10 through MS13 and the above MSes not indicated in FIG. 12. At this time the BS receives TempID of the MSes to which calls are made. The BS does modulo arithmetic on the basis of the received TempID and determines which of the frames 0 through 3 in the superframe it uses for transmitting the paging advertisements PGADV00 through PGADV03.

(Step S32)

When a PLI 2 comes, the BS transmits by the frame 0 the paging advertisement PGADV00 including TempID by which the modulo arithmetic result "0" is obtained and the paging advertisements PGADV00 through PGADV03 including TempID by which the modulo arithmetic results "0" through "3", respectively, are obtained.

There is no MS which is under the control of the BS. Accordingly, the paging advertisement PGADV00 including TempID by which the modulo arithmetic result "0" is obtained is not received by the MS for which the modulo arithmetic result "0" is obtained. Furthermore, the BS may generate the paging advertisements PGADV00 through PGADV03 to be transmitted to the RS as one paging advertisement, and transmit the paging advertisement to the RS. In this case, the RS generates the paging advertisements PGADV00 through PGADV03 from the one paging advertisement received.

(Step S33)

The BS transmits by the frame 1 the paging advertisement PGADV01 including TempID by which the modulo arithmetic result "1" is obtained. The RS transmits by the frame 1 the paging advertisement PGADV01 received from the BS.

The MS11 under the control of the RS and the MS under the control of the RS for which the modulo arithmetic result "1" is obtained receive the paging advertisement PGADV01 by the frame 1.

(Step S34)

The BS transmits by the frame 2 the paging advertisement PGADV02 including TempID by which the modulo arithmetic result "2" is obtained. The RS transmits by the frame 2 the paging advertisement PGADV02 received from the BS.

The MS12 under the control of the RS and the MSes under the control of the RS for which the modulo arithmetic result "2" is obtained receive the paging advertisement PGADV02 by the frame 2.

(Step S35)

The BS transmits by the frame 3 the paging advertisement PGADV03 including TempID by which the modulo arithmetic result "3" is obtained. The RS transmits by the frame the paging advertisement PGADV03 received from the BS. In addition, the paging advertisement PGADV03 is smaller in size than the other paging advertisements PGADV01 and PGADV02, so the RS transmits by the frame 3 the paging advertisement PGADV00 which is to be assigned to the specific frame 0 for transmission.

The MS10 and MS13 under the control of the RS and the MSes under the control of the RS for which the modulo arithmetic result "0" is obtained receive the paging advertisement PGADV03 by the frame 3.

The MS10 and the MSes for which the modulo arithmetic result "0" is obtained are to receive the paging advertisement PGADV00 by the specific frame 0. The MS10 and these MSes cannot recognize a frame other than the specific frame 0 of the frames 1 through 3 by which the paging advertisement PGADV00 is transmitted. Accordingly, the MS10 and these MSes receive all of the frames 1 through 3 other than the specific frame 0 and receive the paging advertisement PGADV00 including their TempID.

A block diagram of the base station is the same as that indicated in FIG. 8. A block diagram of the relay station is the same as that indicated in FIG. 9, but a scheduler 55 in the fourth embodiment differs from the scheduler 55 illustrated in FIG. 9 in function. A block diagram of a mobile station is the same as that indicated in FIG. 10, but a paging advertisement controller 64b in the fourth embodiment differs from the paging advertisement controller 64b illustrated in FIG. 10 in function.

The scheduler 55 of the relay station according to the fourth embodiment assigns paging advertisements other than a paging advertisement which is to be transmitted by a specific frame to frames determined by doing modulo arithmetic. The scheduler 55 then calculates the size of the paging advertisements to be transmitted by the frames other than the specific frame, and assigns the paging advertisement which is to be transmitted by the specific frame to a frame by which a paging advertisement that is the smallest in size is transmitted.

The paging advertisement controller 64b of the mobile station according to the fourth embodiment is the same as the paging advertisement controller 64b described in the third embodiment. That is to say, if the mobile station enters the idle mode and a detector 64a determines that the mobile station is under the control of the relay station, then the paging advertisement controller 64b controls a radio interface 61 so that it will receive the paging advertisement PGADV00 by a frame other than the specific frame. In other words, in order to receive the paging advertisement PGADV00, the paging advertisement controller 64b attempts receiving all the frames 1 through 3 other than the specific frame 0.

As has been described, the relay station assigns a paging advertisement which is to be assigned to a specific frame for transmission to a frame in which the size of a paging advertisement is the smallest, and transmits the paging advertisement to a mobile station in its communication area. By doing so, the relay station can make the size of paging advertisements to be transmitted to mobile stations under its control approximately equal.

A fifth embodiment will now be described in detail with reference to the accompanying drawing. In a fifth embodiment a relay station divides a paging advertisement which is to be assigned to a specific frame for transmission into paging advertisements, distributes the paging advertisements after the division among a plurality of frames other than the specific frame for assignment, and transmits the paging advertisements to mobile stations under its control.

Figure 13:
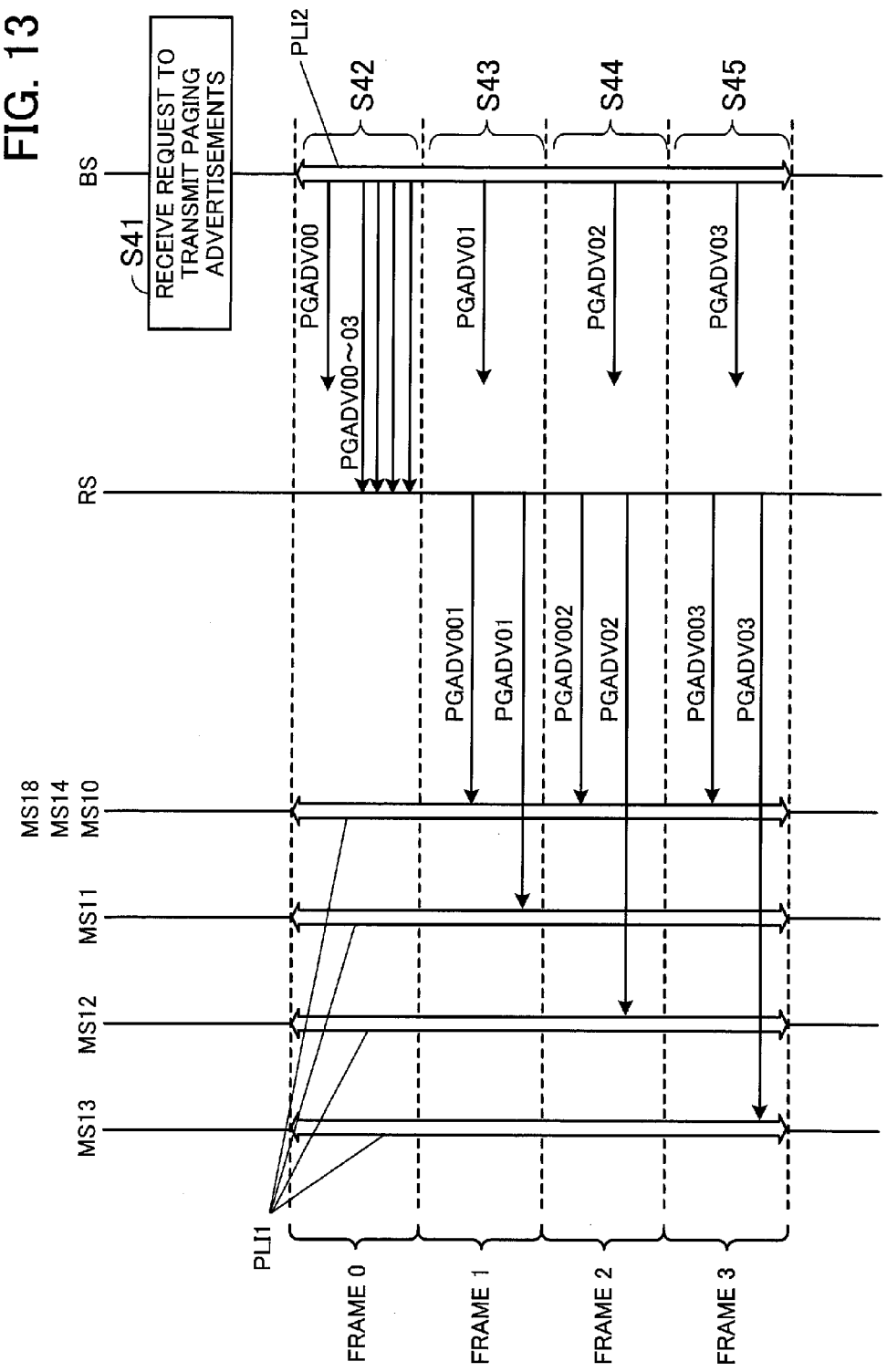
FIG. 13 is a sequence diagram of operation performed in a communication system according to a fifth embodiment.

FIG. 13 is a sequence diagram of operation performed in a communication system according to the fifth embodiment. FIG. 13 indicates the sequence of the operation of a BS, an RS, and MS10 through MS14 and MS18. In FIG. 13, it is assumed that the MS10 through MS14 and the MS18 are in a communication area of the RS. Furthermore, it is assumed that the MS10 through MS14 and the MS18 are in the idle mode and that before the MS10 through MS14 and the MS18 enter the idle mode, TempID=0 through 4 and 8 are assigned to the MS10 through MS14 and the MS18, respectively, by a paging controller. In addition, the MS10 through MS14 and the MS18 do the above modulo arithmetic on the basis of TempID=0 through 4 and 8 assigned thereto, and determine which of frames 0 through 3 in a superframe they use for receiving paging advertisements. Furthermore, it is assumed that the BS transmits all paging advertisements PGADV00 through PGADV03 to the RS by the frame 0 with the frame 0 as a specific frame.

If the paging advertisement PGADV00 which is to be transmitted by the specific frame 0 includes a plurality of TempID, then the RS separates the plurality of TempID, assigns them to frames other than the specific frame 0, and transmits them by the frames. That is to say, the RS divides the paging advertisement PGADV00 received from the BS into new paging advertisements PGADV001 through PGADV003 on the basis of the plurality of TempID included in the paging advertisement PGADV00, and distributes the paging advertisements PGADV001 through PGADV003 among the frames 1 through 3 other than the specific frame 0 for assignment.

In the above example, the paging advertisement PGADV00 received from the BS includes TempID=0, 4, and 8. The RS extracts these TempID, does new modulo arithmetic different from that described above, and determines frames by which TempID=0, 4, and 8 are transmitted.

The new modulo arithmetic is given by $$(\text{TempID Mod 3})+1 \tag{1}$$

According to formula (1), the plurality of TempID transmitted by the specific frame 0 are assigned to the frames 1 through 3 other than the specific frame 0. Paging advertisements including TempID of the MS10, the MS14, and the MS18 are transmitted by the following frames:

$$MS10(\text{TempID}=0){:}(0 \bmod 3)+1=1$$

$$MS14(\text{TempID}=4){:}(4 \bmod 3)+1=2$$

$$MS18(\text{TempID}=8){:}(8 \bmod 3)+1=3$$

As a result, the paging advertisement PGADV001 including TempID=0 is transmitted by the second frame 1 of a PLI 1. The paging advertisement PGADV002 including TempID=4 is transmitted by the third frame 2 of the PLI 1. The paging advertisement PGADV003 including TempID=8 is transmitted by the fourth frame 3 of the PLI 1.

If the MS10 through MS14 and the MS18 are to receive the paging advertisement PGADV00 by the specific frame 0 as a result of the modulo arithmetic (TempID Mod 4), then the MS10 through MS14 and the MS18 perform calculations by the use of formula (1) for determining frames other than the specific frame 0, and determine frames by which the MS10 through MS14 and the MS18 receive the paging advertisements PGADV001 through PGADV003 transmitted from the RS. This is the same with the RS. For example, with the MS14 to which TempID=4 is assigned, the modulo arithmetic result "0" is obtained. Accordingly, on the basis of formula (1), the MS14 receives by the frame 2 the paging advertisement PGADV002 including TempID=4.

(Step S41)

The BS receives from the paging controller a request to transmit paging advertisements to the MS10 through MS14 and the MS18. At this time the BS receives TempID of the MSes to which calls are made. The BS does modulo arithmetic on the basis of the received TempID and determines which of the frames 0 through 3 in the superframe it uses for transmitting the paging advertisements PGADV00 through PGADV03.

(Step S42)

When a PLI 2 comes, the BS transmits by the frame 0 the paging advertisement PGADV00 including TempID=0, 4, and 8 and the paging advertisements PGADV00 through PGADV03 including TempID=0 through 4 and 8.

The MS10 through MS14 and the MS18 are not under the control of the BS, so the MS10, the MS14 and the MS18 do not receive the paging advertisement PGADV00 including TempID=0, 4, and 8. Furthermore, the BS may generate the paging advertisements PGADV00 through PGADV03 to be transmitted to the RS as one paging advertisement, and transmit the paging advertisement to the RS. In this case, the RS generates the paging advertisements PGADV01 through PGADV03 and PGADV001 through PGADV003 from the one paging advertisement received.

(Step S43)

The BS transmits the paging advertisement PGADV01 by the frame 1. The RS transmits by the frame 1 the paging advertisement PGADV01 received from the BS. In addition, the RS transmits by the frame 1 the paging advertisement PGADV001 including TempID=0 of the paging advertisement PGADV00 which is to be transmitted by the specific frame 0.

The MS10 and the MS11 under the control of the RS receive the paging advertisements PGADV001 and PGADV01, respectively, by the frame 1.

(Step S44)

The BS transmits the paging advertisement PGADV02 by the frame 2. The RS transmits by the frame 2 the paging advertisement PGADV02 received from the BS. In addition, the RS transmits by the frame 2 the paging advertisement PGADV002 including TempID=4 of the paging advertisement PGADV00 which is to be transmitted by the specific frame 0.

The MS12 and the MS14 under the control of the RS receive the paging advertisements PGADV02 and PGADV002, respectively, by the frame 2.

(Step S45)

The BS transmits the paging advertisement PGADV03 by the frame 3. The RS transmits by the frame 3 the paging advertisement PGADV03 received from the BS. In addition, the RS transmits by the frame 3 the paging advertisement PGADV003 including TempID=8 of the paging advertisement PGADV00 which is to be transmitted by the specific frame 0.

The MS13 and the MS18 under the control of the RS receive the paging advertisements PGADV03 and PGADV003, respectively, by the frame 3.

A block diagram of the base station is the same as that indicated in FIG. 8. A block diagram of the relay station is the same as that indicated in FIG. 9, but a scheduler 55 in the fifth embodiment differs from the scheduler 55 illustrated in FIG. 9 in function. A block diagram of a mobile station is the same as that indicated in FIG. 10, but a paging advertisement controller 64b in the fifth embodiment differs from the paging advertisement controller 64b illustrated in FIG. 10 in function.

The scheduler 55 of the relay station according to the fifth embodiment divides a paging advertisement which is to be transmitted by a specific frame into paging advertisements on the basis of TempID included in the paging advertisement, and assigns the paging advertisements to frames other than the specific frame for transmission. In accordance with the above formula (1) the scheduler 55 assigns TempID which are to be transmitted by the specific frame to frames other than the specific frame.

If a result of the modulo arithmetic (TempID mod 4) based on TempID assigned by the paging controller is "0", then the paging advertisement controller 64b of the mobile station according to the fifth embodiment does new modulo arithmetic by the use of formula (1) and determines a frame by which the mobile station receives the paging advertisement PGADV001, PGADV002, or PGADV003.

For example, it is assumed that TempID assigned by the paging controller is "8". In this case, the modulo arithmetic result "0" is obtained. Accordingly, the paging advertisement controller 64b does new modulo arithmetic by the use of formula (1) and determines the frame 3 by which the mobile station receives the paging advertisement PGADV003. That is to say, if the mobile station is to receive the paging advertisement PGADV00 by the specific frame 0, then the paging advertisement controller 64b performs a calculation by the use of formula (1) for determining a frame other than the specific frame 0, and determines a frame by which the mobile station receives the paging advertisement PGADV001, PGADV002, or PGADV003 transmitted from the RS.

As has been described, the relay station divides a paging advertisement which is to be assigned to a specific frame for transmission, assigns obtained paging advertisements to a plurality of frames, and transmits the paging advertisements to a mobile station. This makes it possible to make the amount of paging advertisements included in each frame transmitted to a mobile station under the control of the relay station approximately equal. In addition, a mobile station which is to receive the paging advertisement by the specific frame need only attempt receiving the paging advertisement by frames determined by doing the modulo arithmetic indicated by formula (1). As a result, power consumption can be reduced.

The relay station may combine paging advertisements transmitted by each of the frames 1 through 3 into one paging advertisement and transmit it to mobile stations. For example, the relay station may merge the paging advertisements PGADV01 and PGADV001 into one paging advertisement and transmit it to the mobile stations.

A sixth embodiment will now be described in detail with reference to the accompanying drawing. In a sixth embodiment a relay station extracts information, such as tempID of mobile stations, from a specific frame received from a BS. In accordance with a transmission rule different from a transmission rule followed by the base station, the relay station then generates paging advertisements and transmits them by frames other than the specific frame of a PLI.

Figure 14:
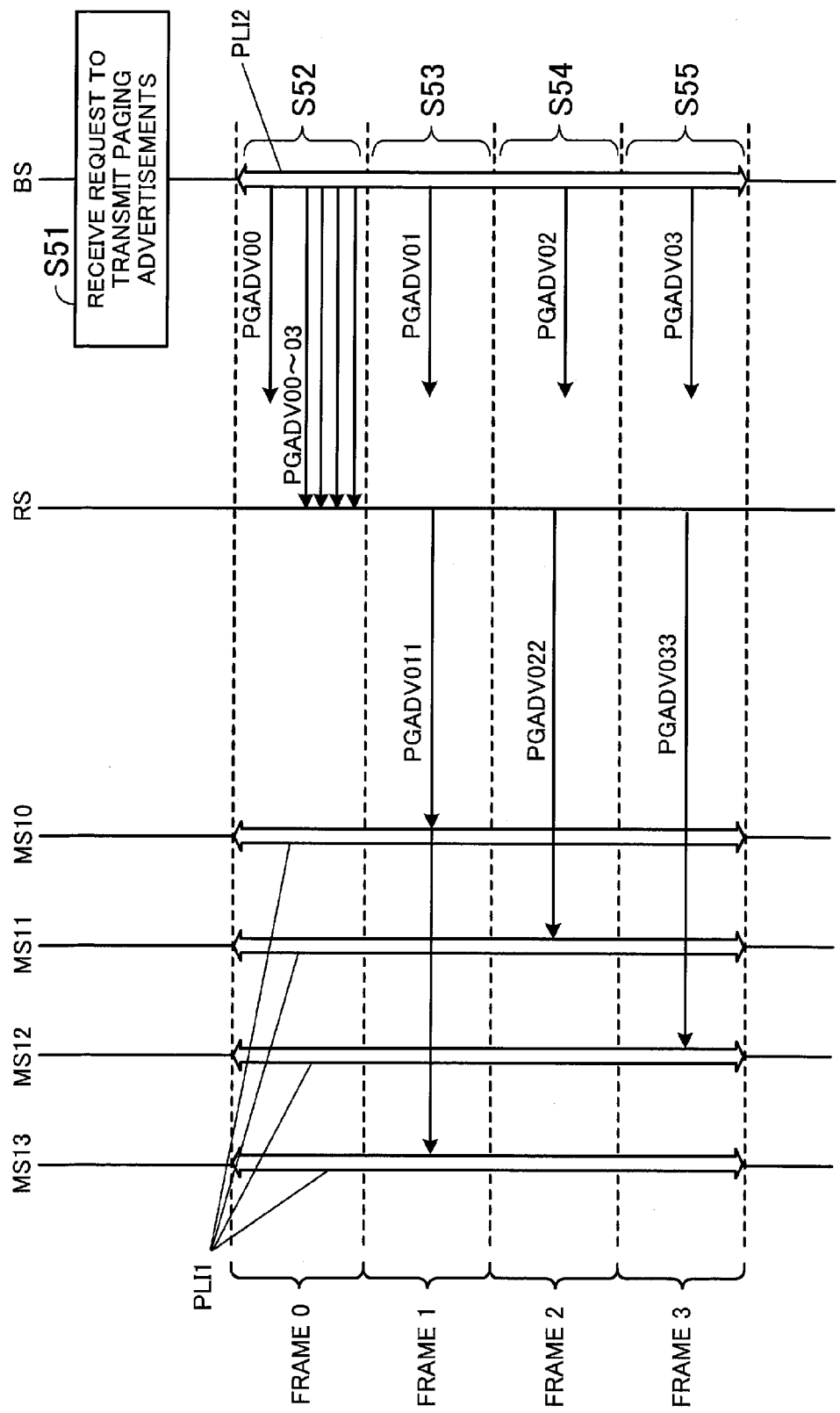
FIG. 14 is a sequence diagram of operation performed in a communication system according to a sixth embodiment.

FIG. 14 is a sequence diagram of operation performed in a communication system according to a sixth embodiment. FIG. 14 indicates the sequence of the operation of a BS, an RS, and MS10 through MS13. In FIG. 14, it is assumed that the MS10 through MS13 are in a communication area of the RS. Furthermore, it is assumed that the MS10 through MS13 are in the idle mode and that before the MS10 through MS13 enter the idle mode, TempID=0 through 3 are assigned to the MS10 through MS13, respectively, by a paging controller.

When the RS receives paging advertisements PGADV00 through PGADV03 from the BS by a specific frame 0, the RS extracts TempID included in the paging advertisements PGADV00 through PGADV03. The RS does new modulo arithmetic different from the above modulo arithmetic on the basis of the extracted TempID, and determines frames by which TempID are transmitted.

The new modulo arithmetic is given by (TempID Mod 3)+1  (2)

Accordingly, frames by which TempID of the MS10 through MS13 are transmitted are determined in the following way:

$MS10(\text{TempID}=0):(0 \bmod 3)+1=1$ $MS11(\text{TempID}=1):(1 \bmod 3)+1=2$ $MS12(\text{TempID}=2):(2 \bmod 3)+1=3$ $MS13(\text{TempID}=3):(3 \bmod 3)+1=1$ As a result, TempID=0 and 3 are transmitted by a paging advertisement PGADV011 in a second frame 1 of a PLI 1. TempID=1 is transmitted by a paging advertisement PGADV022 in a third frame 2 of the PLI 1. TempID=2 is transmitted by a paging advertisement PGADV033 in a fourth frame 3 of the PLI 1. That is to say, according to formula (2), the paging advertisements PGADV011, PGADV022, and PGADV033 are assigned to the frames other than the specific frame 0.

When the MS10 through MS13 are under the control of the RS, the MS10 through MS13 do modulo arithmetic by the use of formula (2) and determine which of the frames 1 through 3 they receive. This is the same with the RS. When the MS10 through MS13 are under the control of the BS, the MS10 through MS13 do the modulo arithmetic (TempID mod 4) described in the second embodiment, and determine which of the frames 0 through 3 they receive.

(Step S51)

The BS receives from the paging controller a request to transmit paging advertisements to the MS10 through MS13. At this time the BS receives TempID of the MS10 through MS13 to which calls are made. The BS does modulo arithmetic on the basis of the received TempID and determines which of the frames 0 through 3 in a superframe it uses for transmitting the paging advertisements PGADV00 through PGADV03.

(Step S52)

When a PLI 2 comes, the BS transmits by the frame 0 the paging advertisement PGADV00 including TempID=0 and the paging advertisements PGADV00 through PGADV03 including TempID=0 through 3 respectively.

The MS10 through MS13 are not under the control of the BS, so the MS10 does not receive the paging advertisement PGADV00 including TempID=0. Furthermore, the BS may generate the paging advertisements PGADV00 through PGADV03 to be transmitted to the RS as one paging advertisement, and transmit the paging advertisement to the RS. In this case, the RS generates the paging advertisements PGADV011, PGADV022, and PGADV033 from the one paging advertisement received.

(Step S53)

The BS transmits the paging advertisement PGADV01 by the frame 1. On the basis of a result of modulo arithmetic done by the use of formula (2), the RS transmits by the frame 1 the paging advertisement PGADV011 including TempID=0 and 3.

On the basis of formula (2), the MS10 and the MS13 under the control of the RS receive the paging advertisement PGADV011 by the frame 1.

(Step S54)

The BS transmits the paging advertisement PGADV02 by the frame 2. On the basis of a result of modulo arithmetic done by the use of formula (2), the RS transmits by the frame 2 the paging advertisement PGADV022 including TempID=1.

On the basis of formula (2), the MS11 under the control of the RS receives the paging advertisement PGADV022 by the frame 2.

(Step S55)

The BS transmits the paging advertisement PGADV03 by the frame 3. On the basis of a result of modulo arithmetic done by the use of formula (2), the RS transmits by the frame 3 the paging advertisement PGADV033 including TempID=2.

On the basis of formula (2), the MS12 under the control of the RS receives the paging advertisement PGADV033 by the frame 3.

Figure 15:
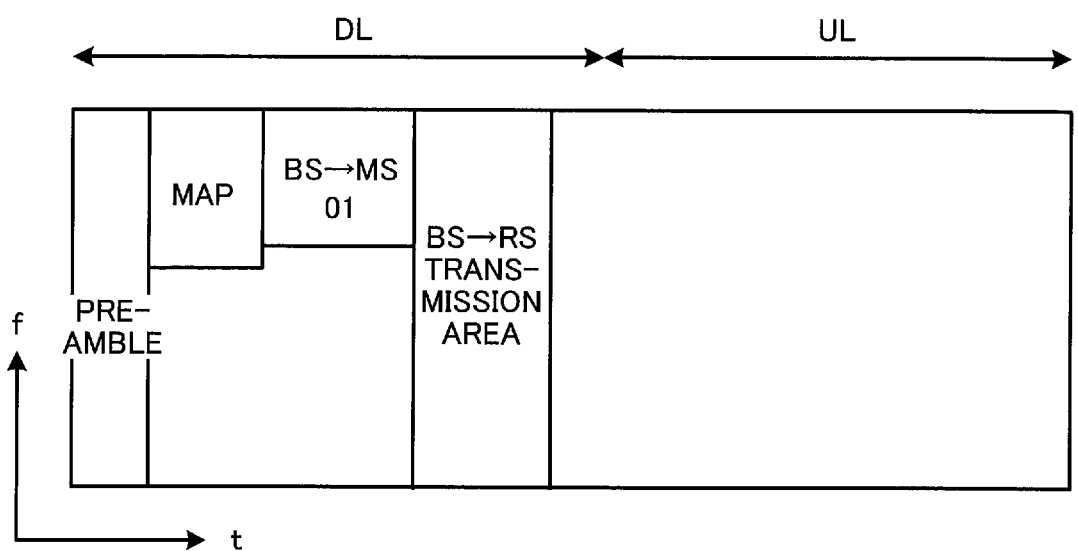
FIG. 15 is an example of the structure of a frame.
Figure 16:
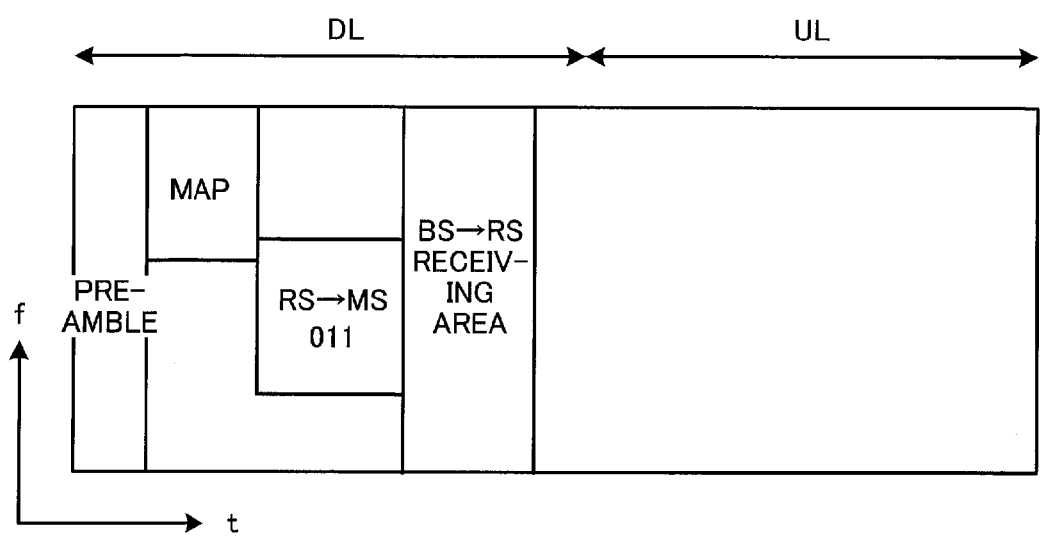
FIG. 16 is an example of the structure of a frame.

FIGS. 15 and 16 are examples of the structure of a frame. A frame illustrated in FIG. 15 corresponds to, for example, the frame 1 transmitted by the BS in FIG. 14. A frame illustrated in FIG. 16 corresponds to, for example, the frame 1 transmitted by the RS in FIG. 14.

The frame 1 is used for transmitting data from the BS to an MS under the control of the BS and transmitting data from the RS to the MSes under the control of the RS. Accordingly, as illustrated in FIG. 15, a DL subframe in a frame transmitted by the BS includes an area used for transmitting data from the BS to an MS under the control of the BS (indicated by "BS→MS" in FIG. 15) and an area used for transmitting data from the BS to the RS (indicated by "BS→RS transmission area" in FIG. 15). The area used for transmitting data from the BS to an MS under the control of the BS is used for transmitting the paging advertisement PGADV01. On the other hand, as illustrated in FIG. 16, a DL subframe in a frame transmitted by the RS includes an area used for transmitting data from the RS to an MS under the control of the RS (indicated by "RS→MS" in FIG. 16) and an area used for receiving data transmitted from the BS (indicated by "BS→RS receiving area" in FIG. 16). The area used for transmitting data from the RS to an MS under the control of the RS is used for transmitting the paging advertisement PGADV011. The paging advertisement PGADV011 includes TempID=0 and 3.

A block diagram of the base station is the same as that indicated in FIG. 8. A block diagram of the relay station is the same as that indicated in FIG. 9, but a scheduler 55 in the sixth embodiment differs from the scheduler 55 illustrated in FIG. 9 in function. A block diagram of a mobile station is the same as that indicated in FIG. 10, but a paging advertisement controller 64b in the sixth embodiment differs from the paging advertisement controller 64b illustrated in FIG. 10 in function.

When the relay station according to the sixth embodiment receives paging advertisements from the base station by a specific frame, the scheduler 55 extracts TempID from the received paging advertisements. The scheduler 55 does modulo arithmetic by the use of formula (2) on the basis of the extracted TempID and assigns frames for transmitting the extracted TempID.

On the basis of a result of detection by a detector 64a, the paging advertisement controller 64b of the mobile station according to the sixth embodiment switches a frame by which it receives a paging advertisement. For example, when the detector 64a detects that the mobile station is under the control of the base station, the paging advertisement controller 64b determines by the use of (TempID mod 4) a frame by which it receives a paging advertisement. When the detector 64*a* detects that the mobile station is under the control of the relay station, the paging advertisement controller 64*b* determines by the use of formula (2) a frame by which it receives a paging advertisement. That is to say, when the mobile station is under the control of the relay station, the paging advertisement controller 64*b* performs a calculation by the use of formula (2) for determining a frame other than the specific frame 0, and determines a frame by which the mobile station receives the paging advertisement PGADV011, PGADV022, or PGADV033 transmitted from the RS.

As has been described, the relay station extracts TempID from paging advertisements transmitted from the base station, and determines frames by which the relay station transmits the extracted TempID by doing modulo arithmetic for determining frames other than a specific frame by which the relay station transmits the paging advertisements. This makes it possible to make the number of paging advertisements transmitted to each mobile station equal. Furthermore, if a mobile station receives a paging advertisement from the relay station, the mobile station need only attempt receiving the paging advertisement by a frame determined by doing the modulo arithmetic indicated by formula (2). As a result, power consumption can be reduced.

In the above description the relay station extracts TempID. However, the relay station may extract other pieces of information, such as an action code, and transmit them by the paging advertisements PGADV011, PGADV022, and PGADV033.

A seventh embodiment will now be described in detail with reference to the accompanying drawing. In a seventh embodiment a base station does the modulo arithmetic which is indicated by formula (2) and which is done by the relay station in the sixth embodiment.

Figure 17:
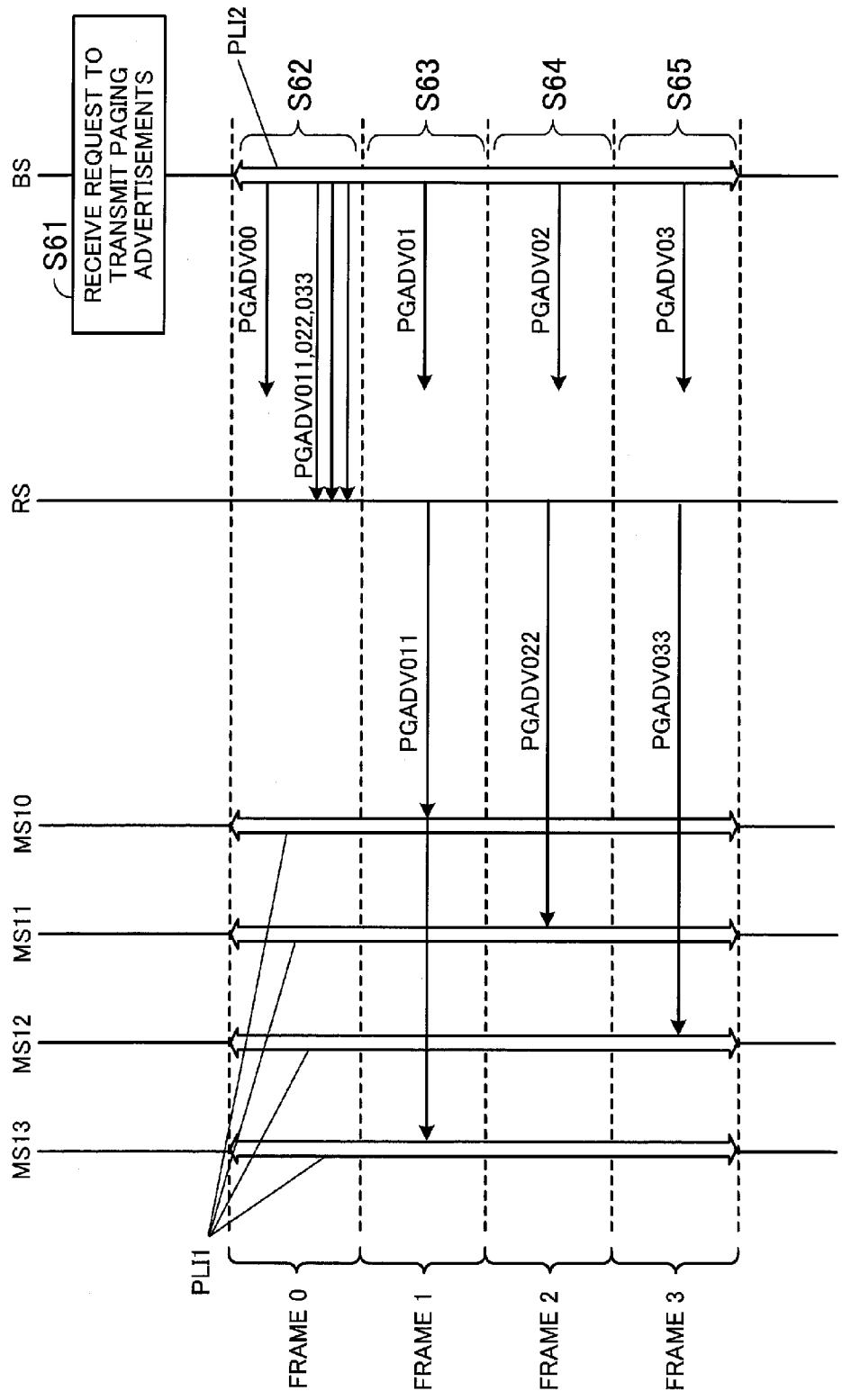
FIG. 17 is a sequence diagram of operation performed in a communication system according to a seventh embodiment.

FIG. 17 is a sequence diagram of operation performed in a communication system according to a seventh embodiment. FIG. 17 indicates the sequence of the operation of a BS, an RS, and MS10 through MS13. In FIG. 17, it is assumed that the MS10 through MS13 are in a communication area of the RS. Furthermore, it is assumed that the MS10 through MS13 are in the idle mode and that before the MS10 through MS13 enter the idle mode, TempID=0 through 3 are assigned to the MS10 through MS13, respectively, by a paging controller.

When the BS receives a paging advertisement transmission request from the paging controller and receives TempID, the BS generates paging advertisements PGADV011, PGADV022, and PGADV033 by which the RS transmits TempID to MSes in its communication area by frames other than a specific frame 0, and assigns the paging advertisements PGADV011, PGADV022, and PGADV033 to the specific frame 0. For example, the BS does modulo arithmetic by the use of formula (2) described above, and generates the paging advertisements PGADV011, PGADV022, and PGADV033 by which the RS transmits TempID to the MS10 through MS13 under its control by frames other than the specific frame 0. To be more concrete, the BS determines on the basis of formula (2) that the RS transmits TempID=0 and 3 by a frame 1, and generates the paging advertisement PGADV011 by which the RS transmits TempID=0 and 3 to MSes under its control. In addition, the BS determines on the basis of formula (2) that the RS transmits TempID=1 by a frame 2, and generates the paging advertisement PGADV022 by which the RS transmits TempID=1 to an MS under its control.

When the RS receives the paging advertisements PGADV011, PGADV022, and PGADV033 by the specific frame 0, the RS transmits them by the frames other than the specific frame 0. For example, the RS transmits the paging advertisement PGADV011 by the frame 1. The RS transmits the paging advertisement PGADV022 by the frame 2. The RS transmits the paging advertisement PGADV033 by the frame 3.

When the MS10 through MS13 are under the control of the RS, the MS10 through MS13 do modulo arithmetic by the use of the above formula (2) and determine which of the frames 1 through 3 they receive. When the MS10 through MS13 are under the control of the BS, the MS10 through MS13 do the modulo arithmetic (TempID mod 4) described in the second embodiment, and determine which of the frames 0 through 3 they receive.

(Step S61)

The BS receives from the paging controller a request to transmit paging advertisements to the MS10 through MS13. At this time the BS receives TempID of the MS10 through MS13 to which calls are made. The BS does the modulo arithmetic (TempID mod 4) on the basis of the received TempID and determines which of the frames 0 through 3 in a superframe it uses for transmitting paging advertisements PGADV00 through PGADV03.

Furthermore, the BS does modulo arithmetic by the use of formula (2) and generates the paging advertisements PGADV011, PGADV022, and PGADV033 by which the RS transmits tempID to the MS10 through MS13 under the control of the RS by the frames 1 through 3 other than the specific frame 0.

(Step S62)

When a PLI 2 comes, the BS transmits by the frame 0 the paging advertisement PGADV00 including TempID=0 and the paging advertisements PGADV011, PGADV022, and PGADV033 including TempID=0 through 3.

The MS10 through MS13 are not under the control of the BS, so the MS10 does not receive the paging advertisement PGADV00 including TempID=0. Furthermore, the BS may generate the paging advertisements PGADV011, PGADV022, and PGADV033 to be transmitted to the RS as one paging advertisement, and transmit the paging advertisement to the RS.

(Step S63)

The BS transmits the paging advertisement PGADV01 by the frame 1. The RS transmits the paging advertisement PGADV011 received from the BS.

On the basis of formula (2), the MS10 and the MS13 under the control of the RS receive the paging advertisement PGADV011 by the frame 1.

(Step S64)

The BS transmits the paging advertisement PGADV02 by the frame 2. The RS transmits the paging advertisement PGADV022 received from the BS.

On the basis of formula (2), the MS11 under the control of the RS receives the paging advertisement PGADV022 by the frame 2.

(Step S65)

The BS transmits the paging advertisement PGADV03 by the frame 3. The RS transmits the paging advertisement PGADV033 received from the BS.

On the basis of formula (2), the MS12 under the control of the RS receives the paging advertisement PGADV033 by the frame 3.

A block diagram of the base station is the same as that indicated in FIG. 8, but a paging advertisement controller 34*a* in the seventh embodiment differs from the paging advertisement controller 34*a* illustrated in FIG. 8 in function. A block diagram of the relay station is the same as that indicated in FIG. 9, but a scheduler 55 in the seventh embodiment differs from the scheduler 55 illustrated in FIG. 9 in function. A block diagram of a mobile station is the same as that indicated in FIG. 10, but a paging advertisement controller 64*b* in the seventh embodiment differs from the paging advertisement controller 64*b* illustrated in FIG. 10 in function.

As described in FIG. 8, the paging advertisement controller 34*a* of the base station according to the seventh embodiment does the modulo arithmetic (TempID mod 4). In addition, the paging advertisement controller 34*a* does modulo arithmetic by the use of formula (2) and generates the paging advertisements PGADV011, PGADV022, and PGADV033. The generated paging advertisements PGADV011, PGADV022, and PGADV033 are assigned to the specific frame by a scheduler 33 and are transmitted to the RS.

The scheduler 55 of the relay station according to the seventh embodiment assigns the paging advertisements PGADV011, PGADV022, and PGADV033 to the frames 1 through 3 on the basis of, for example, frame information included in the paging advertisements PGADV011, PGADV022, and PGADV033. For example, the frame information "1", "2", and "3" are included in the paging advertisements PGADV011, PGADV022, and PGADV033, respectively, and the scheduler 55 assigns the paging advertisement PGADV011 including the frame information "1" to the frame 1 for transmission.

As described in the sixth embodiment, the paging advertisement controller 64*b* of the mobile station according to the seventh embodiment determines a frame by which it receives a paging advertisement on the basis of the modulo arithmetic (TempID mod 4) or modulo arithmetic using formula (2).

As has been described, the base station generates paging advertisements by which the relay station transmits TempID to mobile stations under the control of the relay station by frames other than a specific frame. The base station then assigns the generated paging advertisements to the specific frame and transmits the paging advertisements to the relay station. This makes it possible to make the number of paging advertisements which the relay station transmits to each mobile station equal. Furthermore, if a mobile station receives a paging advertisement from the relay station, the mobile station need only attempt receiving the paging advertisement by a frame determined by doing the modulo arithmetic indicated by formula (2). As a result, power consumption can be reduced.

The operation of the BSes, the RSes, and the MSes according to the second through seventh embodiments will now be described by the use of flow charts. Hereinafter a process and procedure under which a BS transmits paging advertisements to MSes under its control will be referred to as a "first rule", and a process and procedure under which an RS transmits paging advertisements to MSes under its control will be referred to as a "second rule".

Figure 18:
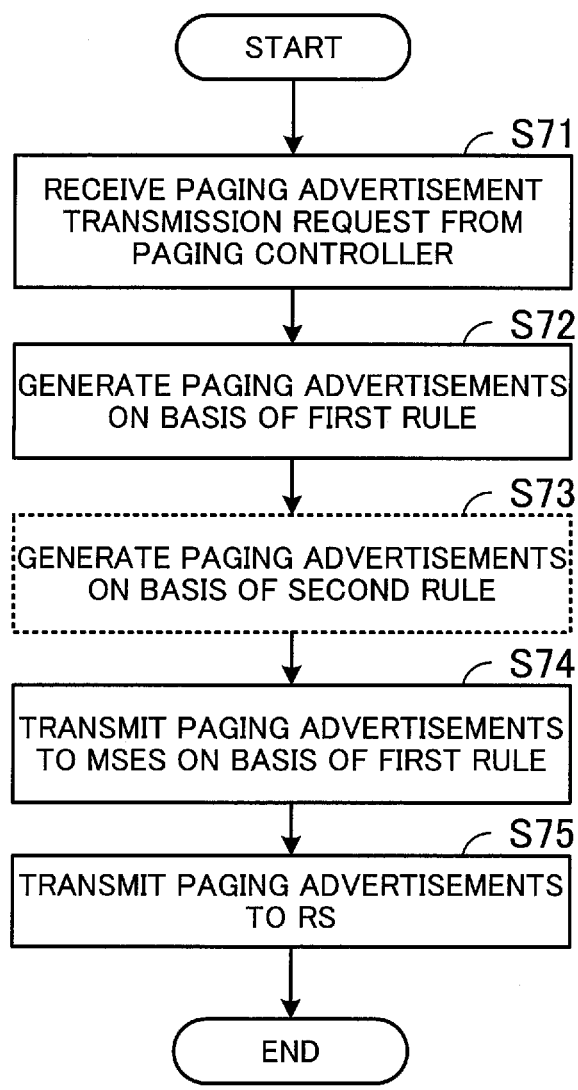
FIG. 18 is a flow chart of the operation of a BS.

FIG. 18 is a flow chart of the operation of a BS.
(Step S71)
A BS receives a paging advertisement transmission request from a paging controller.
(Step S72)
On the basis of a first rule, the BS generates paging advertisements to be transmitted to MSes under its control.
(Step S73)
On the basis of a second rule, the BS generates paging advertisements which an RS transmits to MSes under its control. This step corresponds to step S61 of FIG. 17 and is performed in the case of the seventh embodiment.
(Step S74)
When a PLI comes, the BS transmits the paging advertisements generated in step S72 to the MSes on the basis of the first rule.
(Step S75)
The BS transmits the paging advertisements generated in step S72 (and step S73 in the case of the seventh embodiment) to an RS.

Figure 19:
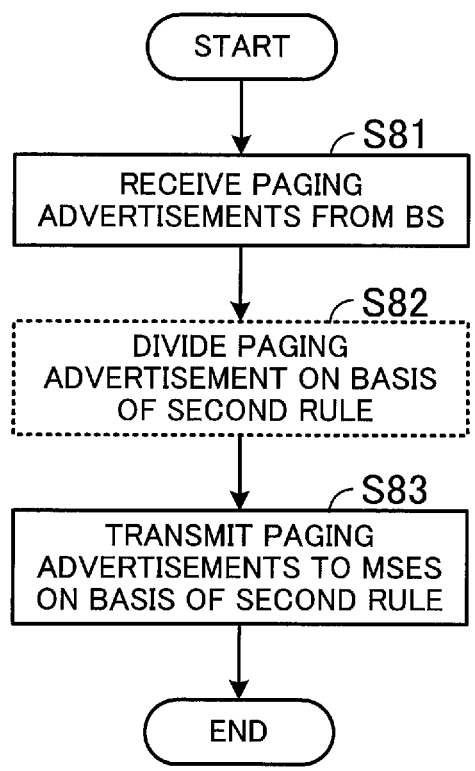
FIG. 19 is a flow chart of the operation of an RS.

FIG. 19 is a flow chart of the operation of an RS.
(Step S81)
An RS receives paging advertisements from a BS.
(Step S82)
The RS divides a paging advertisement on the basis of the second rule. This step is performed in the case of the fifth embodiment.
(Step S83)
The RS transmits the paging advertisements received in step S81 (paging advertisements obtained by the division in step S82 in the case of the fifth embodiment) to MSes under its control on the basis of the second rule.

Figure 20:
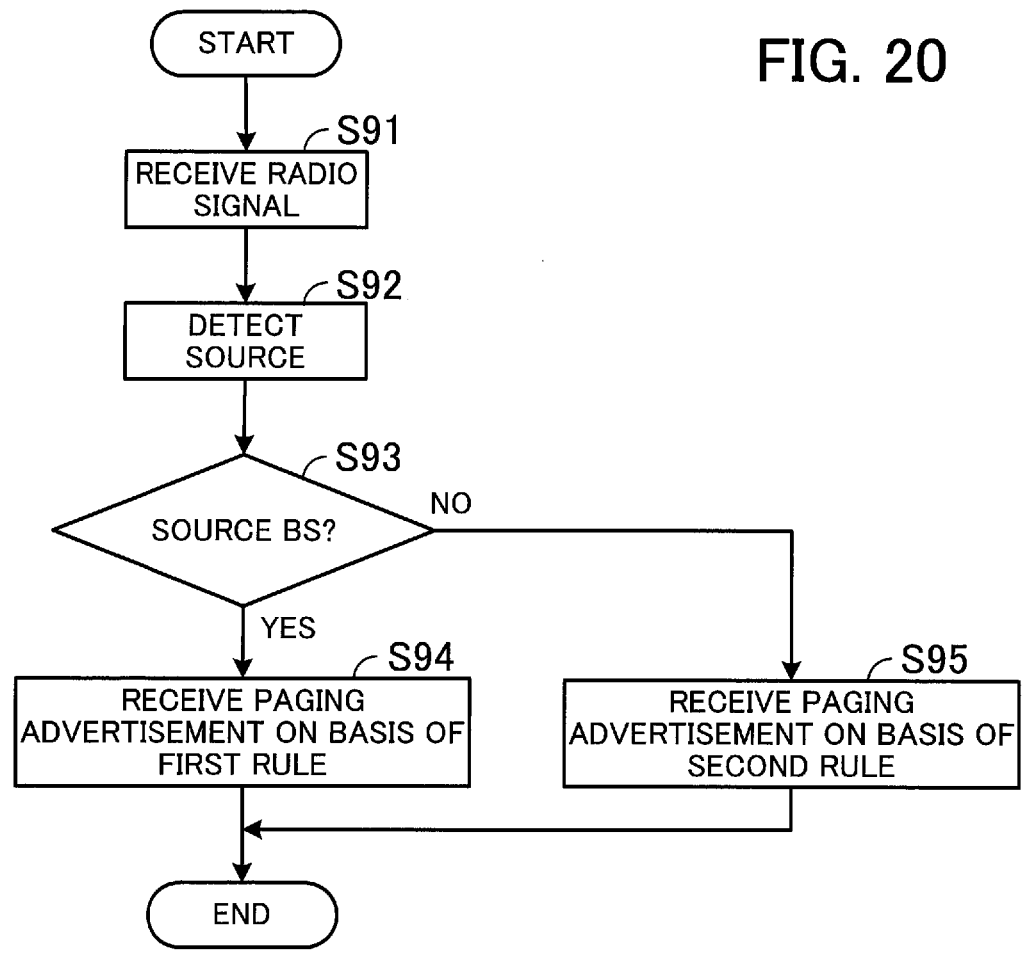
FIG. 20 is a flow chart of the operation of an MS.

FIG. 20 is a flow chart of the operation of an MS.
(Step S91)
An MS receives a downlink radio signal.
(Step S92)
The MS detects a source of the received radio signal.
(Step S93)
The MS determines whether or not the source of the received radio signal is a BS. If the source of the received radio signal is a BS, then the MS proceeds to step S94. If the source of the received radio signal is not a BS, that is to say, if the source of the received radio signal is an RS, then the MS proceeds to step S95.
(Step S94)
The MS receives a paging advertisement on the basis of the first rule.
(Step S95)
The MS receives a paging advertisement on the basis of the second rule.

According to the disclosed communication system, base station, relay station, mobile station, and communication method, it is possible to perform radio communication with the load on a base station controlled.

All examples and conditional language provided herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that various changes, substitutions, and alterations could be made hereto without departing from the spirit and scope of the invention.

What is claimed is:

1. A communication system comprising:
a plurality of mobile stations configured to be paged via one of a series of frames appearing periodically;
a base station configured to map paging information associated with the plurality of mobile stations to a first frame of the series of frames, the paging information including identifiers assigned to the plurality of mobile stations by an upper apparatus at a time the plurality of mobile stations enter an idle state; and
a relay station configured to receive the first frame comprising the paging information associated with the plurality of mobile stations, remap the received paging information to a plurality of second frames that follow the first frame, and sequentially transmit the plurality of second frames to the plurality of mobile stations;

wherein the plurality of mobile stations are configured to perform calculations based on identifiers for receiving the paging information by the plurality of second frames, and change frames to be received.

2. The communication system according to claim 1, wherein the relay station maps the paging information which is to be mapped to the first frame to a frame determined in advance.

3. The communication system according to claim 1, wherein the relay station maps the paging information which is to be mapped to the first frame to a free frame to which the paging information has not been mapped by the base station.

4. The communication system according to claim 1, wherein the relay station maps the paging information which is to be mapped to the first frame to a frame in which size of transmitted data is smallest.

5. The communication system according to claim 1, wherein the relay station divides the paging information which is to be mapped to the first frame, distributes obtained paging information among frames other than the first frame, and maps the obtained paging information to frames other than the first frame.

6. The communication system according to claim 1, wherein in order to map the paging information, the relay station performs calculations based on identifiers for mapping the paging information to the plurality of second frames.

7. The communication system according to claim 1, wherein if the plurality of mobile stations are under control of the relay station and are to receive the paging information by the first frame if under control of the base station, the plurality of mobile stations change frames by which the plurality of mobile stations receive the paging information to frames other than the first frame which are determined in advance.

8. The communication system according to claim 1, wherein if the plurality of mobile stations are under control of the relay station and are to receive the paging information by the first frame, the plurality of mobile stations change frames by which the plurality of mobile stations receive the paging information to all frames other than the first frame.

9. The communication system according to claim 1, wherein the base station generates relay station paging information used by the relay station for transmitting the paging information to the plurality of mobile stations under control of the relay station by the plurality of second frames, and maps the relay station paging information to the first frame.

10. A base station comprising:
a transmitter configured to map paging information, destinations of which are a plurality of mobile stations, to a first frame, thereby enabling a relay station to transmit the paging information by a plurality of second frames following the first frame and enabling the plurality of mobile stations to receive the paging information if under control of the relay station, the transmitter being configured to transmit the paging information directly to the plurality of mobile stations sequentially by the first frame, thereby enabling the plurality of mobile stations to receive the paging information if under control of the base station,
wherein the first frame and the plurality of second frames appear periodically; the paging information includes identifiers assigned to the plurality of mobile stations by an upper apparatus at a time the plurality of mobile stations enter an idle state; and the plurality of mobile stations are configured to perform calculations based on identifiers for receiving the paging information by the plurality of second frames, and change frames to be received.

11. A relay station for relaying communication between a base station and a plurality of mobile stations, the relay station comprising:
a receiver configured to receive, from the base station, paging information mapped to a first frame of a series of frames appearing periodically, the paging information including identifiers assigned to the plurality of mobile stations by an upper apparatus at a time the plurality of mobile stations enter an idle state; and
a transmitter configured to remap the paging information to a plurality of second frames that follow the first frame, the transmitter being configured to transmit the plurality of second frames to the plurality of mobile stations which were to receive the paging information by the first frame if under control of the base station
wherein the plurality of mobile stations are configured to perform calculations based on identifiers for receiving the paging information by the plurality of second frames, and change frames to be received.

12. A mobile station comprising:
a receiver configured to receive paging information by a first frame if under control of a base station, the receiver being configured to change frames by which the receiver receives the paging information to a plurality of second frames if under control of a relay station and to perform calculations based on identifiers for receiving the paging information by the plurality of second frames, wherein the paging information includes identifiers assigned to a plurality of mobile stations by an upper apparatus at a time the plurality of mobile stations enter an idle state.

13. A communication method comprising:
mapping, by a base station, paging information associated with a plurality of mobile stations to a first frame of a series of frames appearing periodically, the paging information including identifiers assigned to the plurality of mobile stations by an upper apparatus at a time the plurality of mobile stations enter an idle state, the plurality of mobile stations being configured to be paged via one of a series of frames, perform calculations based on identifiers for receiving the paging information by the plurality of second frames, and change frames to be received;
receiving, by a relay station, the first frame comprising the paging information associated with the plurality of mobile stations;
remapping, by the relay station, the paging information to a plurality of second frames that follow the first frame; and
transmitting, by the relay station, sequentially the plurality of second frames to the plurality of mobile stations.

* * * * *